US011470830B1

(12) United States Patent
Bosteels et al.

(10) Patent No.: US 11,470,830 B1
(45) Date of Patent: Oct. 18, 2022

(54) VESSEL MOUNTED ARTEMIA HARVEST DEVICE

(71) Applicant: Great Salt Lake Brine Shrimp Cooperative, Inc., Ogden, UT (US)

(72) Inventors: Thomas M. J. G. Bosteels, Ogden, UT (US); Philip D. Brown, Ogden, UT (US); Shawn G. Smith, Ogden, UT (US)

( * ) Notice: Subject to any disclaimer, the term of this patent is extended or adjusted under 35 U.S.C. 154(b) by 682 days.

(21) Appl. No.: 15/722,839

(22) Filed: Oct. 2, 2017

Related U.S. Application Data

(60) Provisional application No. 62/403,039, filed on Sep. 30, 2016.

(51) Int. Cl.
*A01K 73/00* (2006.01)
*A01K 73/02* (2006.01)
(Continued)

(52) U.S. Cl.
CPC .............. *A01K 73/04* (2013.01); *A01K 73/00* (2013.01); *A01K 73/025* (2013.01); *A01K 73/12* (2013.01); *A01K 74/00* (2013.01); *A01K 75/00* (2013.01)

(58) Field of Classification Search
CPC ...... A01K 73/00; A01K 73/02; A01K 73/025; A01K 73/04; A01K 73/045; A01K 73/05;
(Continued)

(56) References Cited

U.S. PATENT DOCUMENTS 76,387 A * 4/1868 Bell ................. A01K 73/06
43/8
478,579 A * 7/1892 Dunham ............... A01K 73/06
43/8
(Continued)

FOREIGN PATENT DOCUMENTS

DE 416627 C * 7/1925 ............. A01K 74/00
DE 733036 C * 3/1943 ............. A01K 74/00
(Continued)

*Primary Examiner* — Darren W Ark
(74) *Attorney, Agent, or Firm* — Brent T. Winder; Winder Intellectual Property Law LLC

(57) ABSTRACT

A device mounted to a vessel for harvesting a subsurface concentration of artemia cysts. In certain embodiments, the device includes a vertically adjustable front net support, a vertically adjustable rear net support and a net having a first end secured to the front net support and a second end secured to the rear net support. A conduit can be coupled to the second end of the net whereby the concentrated artemia cysts are drawn from the second end of net to a processing destination. In certain embodiments, the net has an aspect ratio of at least approximately 4:1. The processing destination could be the vessel or some other destination. In certain embodiments, the vessels are equipped with a dewatering station to which the concentrated cysts are directed for further processing. In some embodiments, the net is secured to a frame which is in turn coupled to the front net support. The front net support can include one or more arms. In certain embodiments, the front net support includes a brace which can be attached to the vessel. The brace can include (Continued)

one more sleeves that correspond to the one or more arms and be hingedly attached to the vessel.

18 Claims, 20 Drawing Sheets

(51) Int. Cl.
*A01K 73/04* (2006.01)
*A01K 73/12* (2006.01)
*A01K 75/00* (2006.01)
*A01K 74/00* (2006.01)

(58) Field of Classification Search
CPC ........ A01K 73/12; A01K 74/00; A01K 79/00; A01K 75/00
USPC .............................. 43/6.5, 7, 8, 9.3; 114/255
See application file for complete search history.

(56) References Cited

U.S. PATENT DOCUMENTS

| | | | | |
|---|---|---|---|---|
| 1,138,541 A * | 5/1915 | Conekin | ............... | A01K 75/02 43/6.5 |
| 1,138,542 A * | 5/1915 | Conekin | ............... | A01K 75/02 43/8 |
| 1,304,302 A * | 5/1919 | Gage, Sr. | ............... | A01K 73/06 43/8 |
| 1,447,553 A * | 3/1923 | Hudson | ............... | A01K 73/00 43/6.5 |
| 1,467,763 A * | 9/1923 | Lybeck | ............... | A01K 79/00 43/6.5 |
| 1,486,485 A * | 3/1924 | Frissell | ............... | A01K 80/00 43/6.5 |
| 1,489,917 A * | 4/1924 | Blecker | ............... | A01K 74/00 43/6.5 |
| 1,490,428 A * | 4/1924 | Paris | ............... | A01K 74/00 43/8 |
| 1,606,668 A * | 11/1926 | Rubach | ............... | A01K 79/00 43/6.5 |
| 1,619,560 A * | 3/1927 | Blecker | ............... | A01K 74/00 43/6.5 |
| 1,717,835 A * | 6/1929 | Calhoun | ............... | A01K 71/00 43/6.5 |
| 1,745,251 A * | 1/1930 | Enright | ............... | A01K 74/00 43/6.5 |
| 1,777,783 A * | 10/1930 | Burns | ............... | A01K 91/18 43/6.5 |
| 2,064,408 A * | 12/1936 | Blecker | ............... | A01K 74/00 43/6.5 |
| 2,204,584 A * | 6/1940 | Flower | ............... | E02F 3/92 119/235 |
| 2,413,552 A * | 12/1946 | Ethridge | ............... | A01K 74/00 43/103 |
| 2,651,874 A * | 9/1953 | Key | ............... | B63B 35/14 43/6.5 |
| 2,832,168 A * | 4/1958 | Brown | ............... | A01K 79/02 43/17.1 |
| 2,890,543 A * | 6/1959 | Mitchell | ............... | A01K 73/02 43/9.1 |
| 3,015,902 A * | 1/1962 | Mount | ............... | A01K 79/02 43/7 |
| 3,273,276 A * | 9/1966 | Englesson | ............... | A01K 63/02 43/6.5 |
| 3,440,752 A * | 4/1969 | Minter | ............... | A01K 73/00 43/6.5 |
| 3,768,193 A * | 10/1973 | London | ............... | A01K 71/00 43/6.5 |
| 3,909,972 A * | 10/1975 | Schoenberger | ........ | A01K 74/00 43/8 |
| 3,987,572 A * | 10/1976 | Bieser | ............... | A01K 71/00 43/4.5 |
| 4,086,717 A * | 5/1978 | Aucoin, Jr. | ............. | A01K 74/00 43/6.5 |
| 4,205,507 A * | 6/1980 | McClure | ............... | A01D 44/00 56/16.2 |
| 4,458,621 A * | 7/1984 | De Clifford | ............ | B63B 35/00 114/255 |
| 4,509,286 A * | 4/1985 | John | ............... | A01K 73/00 43/9.1 |
| 4,663,879 A * | 5/1987 | Bergeron, Jr. | ......... | A01K 80/00 43/4.5 |
| 4,929,350 A * | 5/1990 | Wade | ............... | A01K 79/00 210/157 |
| 5,024,009 A * | 6/1991 | Kirkman | ............... | A01K 73/12 37/316 |
| 5,048,222 A * | 9/1991 | Correll | ............... | A01K 80/00 43/9.1 |
| 5,181,479 A * | 1/1993 | Hiebert | ............... | A01K 79/00 119/217 |
| 5,457,908 A * | 10/1995 | Sanders | ............... | A01K 80/00 43/6.5 |
| 5,566,492 A * | 10/1996 | Swenson | ............... | A01K 79/00 43/6.5 |
| 5,738,036 A * | 4/1998 | Jones | ............... | B63B 35/14 114/255 |
| 5,839,216 A * | 11/1998 | Baker | ............... | A01K 79/00 43/6.5 |
| 6,112,699 A * | 9/2000 | Saxby | ............... | A01K 80/00 119/213 |
| 6,115,954 A * | 9/2000 | Willener | ............... | A01K 79/00 210/242.3 |
| 6,328,165 B1 * | 12/2001 | Baker | ............... | A01K 79/00 209/235 |
| 6,343,433 B1 * | 2/2002 | Granberg | ............... | A01K 75/00 114/255 |
| 6,519,892 B1 * | 2/2003 | Jaime | ............... | A01K 73/00 43/6.5 |
| 8,020,336 B2 * | 9/2011 | Hu | ............... | A01K 73/02 43/9.1 |
| 10,039,270 B2 * | 8/2018 | Ma | ............... | A01K 73/04 |
| 2002/0095852 A1* | 7/2002 | Bosteels | ............... | A01K 73/12 43/6.5 |
| 2005/0160656 A1* | 7/2005 | Safwat | ............... | D04C 1/12 43/9.95 |
| 2005/0274204 A1* | 12/2005 | Linde | ............... | A01K 73/02 73/863.23 |
| 2006/0005451 A1* | 1/2006 | Norman | ............... | A01K 97/20 43/8 |
| 2009/0139129 A1* | 6/2009 | Hicks | ............... | A01K 67/033 43/4.5 |
| 2017/0295763 A1* | 10/2017 | Goe | ............... | A01K 74/00 |
| 2021/0378219 A1* | 12/2021 | Huang | ............... | A01K 75/06 |

FOREIGN PATENT DOCUMENTS

| | | | | |
|---|---|---|---|---|
| FR | 517147 A * | 4/1921 | ............ | A01K 74/00 |
| FR | 570709 A * | 5/1924 | ............ | A01K 74/00 |
| FR | 2639316 A1 * | 5/1990 | ............ | B63B 35/14 |
| FR | 2788933 B1 * | 5/2001 | ............ | A01K 74/00 |
| GB | 191422671 A * | 5/1915 | ............ | A01K 74/00 |
| GB | 339178 A * | 12/1930 | ............ | A01K 74/00 |
| JP | 6018874 Y2 | 5/1994 | | |
| KR | 100821460 B1 * | 4/2008 | | |
| KR | 20140130656 A * | 11/2014 | | |
| WO | WO-9815174 A1 * | 4/1998 | ............ | A01K 73/02 |

* cited by examiner

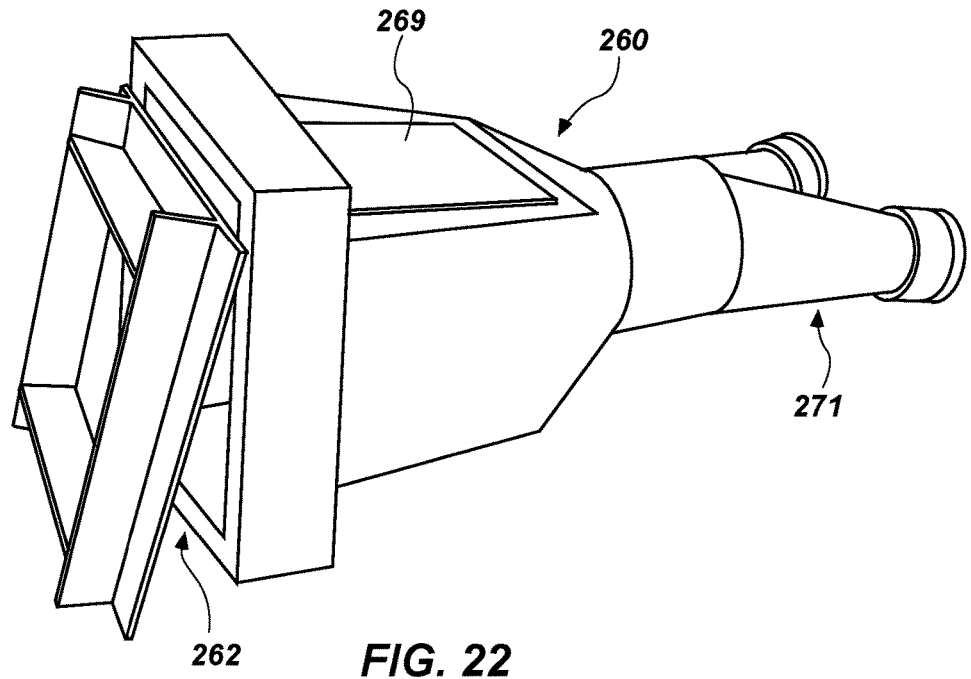
FIG. 22
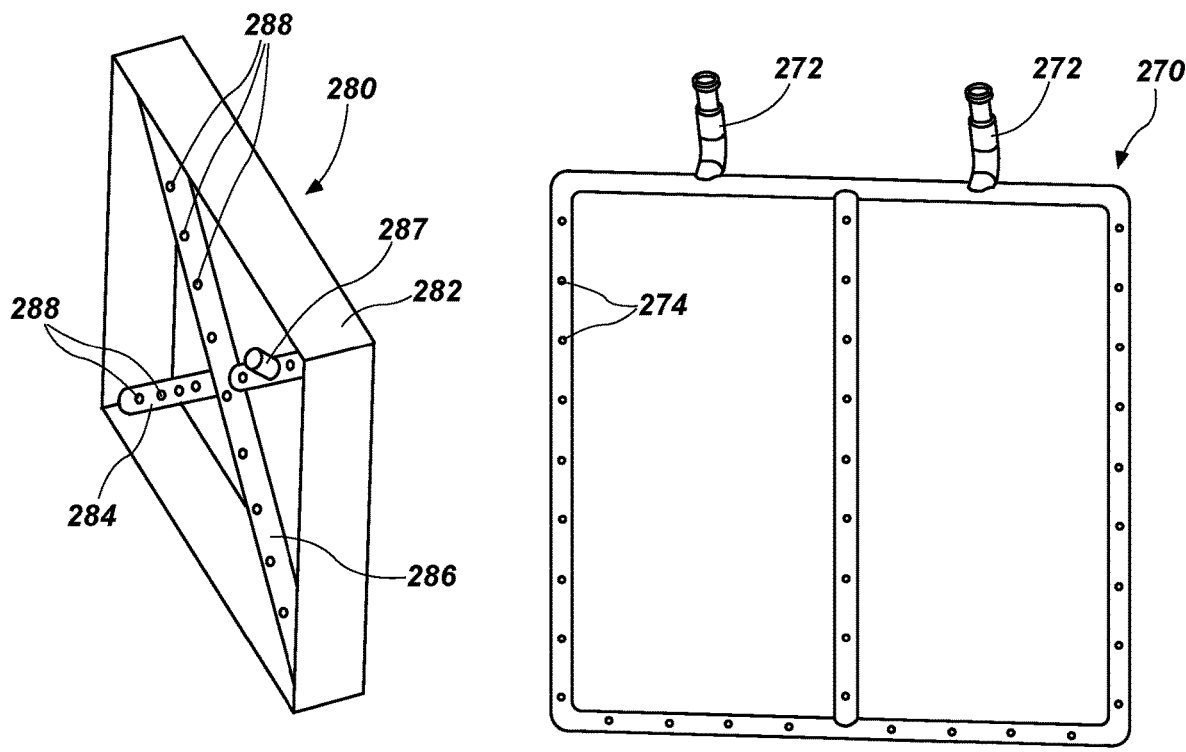
FIG. 23
FIG. 24

VESSEL MOUNTED ARTEMIA HARVEST DEVICE

PRIORITY

This application claims priority to U.S. provisional patent application No. 62/403,039, filed Sep. 30, 2016 the content of which is hereby incorporated by reference in its entirety for its supporting teachings.

BACKGROUND

Traditionally *Artemia salina*, commonly known as brine shrimp, cysts collecting on the surface of a water body have been harvested using a variety of devices. These floating cysts often concentrate in streaks through wind and currents. Existing harvest devices have focused on further concentrating these surface accumulations and mechanically transferring the floating cysts into holding containers on harvest vessels and/or on the shore of the lake.

Brine shrimp cysts will not only float on the surface of the body of water, but may at times be dispersed in the water column; accumulate on the bottom of the body of water; or accumulate into dense concentrations in the water column either just below the water surface or further down in the water column.

The Great Salt Lake—which has a large brine shrimp population and is a commonly harvested body of water—usually contains a monimolimnion (referred to colloquially as the deep brine layer) characterized by higher salinity and separated from the less saline overlying water column by a layer of rapid salinity change (chemocline). Benthic cysts have a tendency to accumulate at the chemocline and within the monimolimnion and will at times accumulate in dense concentrations, possibly as a result of currents and other non-determined reasons. Sonar technology can be used to detect subsurface accumulations of cysts be it at the chemocline or in the water column.

The present invention in its various embodiments allows for harvesting of non-floating cyst accumulations at or below the surface of the lake. Conventional cyst collection involves skimming the surface similar to what is done with oil spills. A modified oil recovery boom is deployed and circles around the slicks concentrating them. Once concentrated, the cysts are pumped/vacuumed up. One problem with this approach is that it only allows for what is essentially the very top of the cyst clusters to be gathered (typically around eighteen inches is maximum depth).

Moreover, under current harvesting practices, fishermen are essentially waiting around scanning the water surface for the slicks to appear. Sometimes the slicks are visible, but not harvestable as they are a few feet under the surface. Current techniques require harvesters to effectively wait until the cysts surface hoping it will happen.

The present invention allows harvesters to go out and gather such collections whether at surface or below surface. It can gather surface slicks as well as accumulations subsurface. The maximum depth is only constrained by the depth of body of water being fished as well as mechanical capacity of the vessel so equipped.

SUMMARY

The present invention is a device mounted to a vessel for harvesting a concentration of artemia cysts. In certain embodiments, the device includes a vertically adjustable front net support, a vertically adjustable rear net support and a net having a first end secured to the front net support and a second end secured to the rear net support. In certain embodiments, the net has an aspect ratio of at least approximately 4:1. A conduit can be coupled to the second end of the net whereby the artemia cysts are drawn from the second end of net to a processing destination. The processing destination could be the vessel or some other destination. In certain embodiments, the vessels are equipped with a dewatering station to which the concentrated cysts are directed for further processing. In some embodiments, the net is secured to a frame which is in turn coupled to the front net support. The front net support can include one or more arms. In certain embodiments, the front net support includes a brace which can be attached to the vessel. The brace can include one more sleeves that correspond to the one or more arms and be hingedly attached to the vessel.

In yet other embodiments, the present invention is an artemia harvesting device having a front net support, a rear net support and a net having a first opening coupled to the front net support and a second opening coupled to the rear net support. In certain embodiments, the net has an aspect ratio of at least approximately 4:1. A conduit in fluid communication with the second opening of the net allows a concentration of artemia cysts to be drawn from the second opening of the net to a processing destination—which can be a variety of locations but is typically a dewatering station on the vessel to which the harvesting device is mounted.

The conduit can be in fluid communication with the second opening of the net by means of a coupling. The rear net support can include a rear connector frame capable of supporting the coupling. In one embodiment, the rear connector frame includes one or more notches that correspond to one or more braces on the coupling.

The front net support can be vertically adjustable as can the rear net support. In certain embodiments, the rear net support is also horizontally or laterally adjustable. The rear connector frame can be coupled to a shaft which in turn can be in communication with a vertical adjustment mechanism. In certain embodiments, the vertical adjustment mechanism is coupled to a lateral adjustment mechanism.

BRIEF DESCRIPTION OF THE DRAWINGS

FIG. 22 depicts a side perspective view of a coupling according to one embodiment of the present invention.

FIG. 23 depicts an internal net pumping mechanism according to one embodiment of the present invention.

FIG. 24 depicts a net opening pumping mechanism according to one embodiment of the present invention.

DESCRIPTION OF ILLUSTRATED EMBODIMENTS

Figure 1:
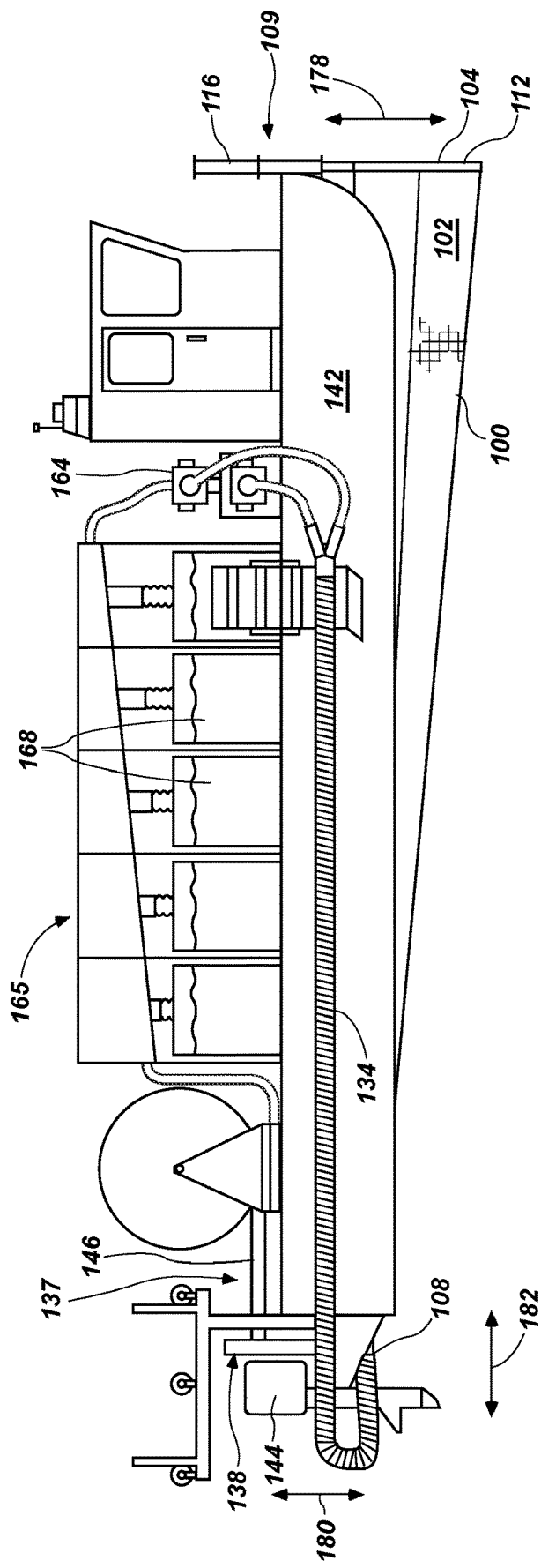
FIG. 1 is a side view of a vessel mounted artemia harvest device according to one embodiment of the present invention.
Figure 2:
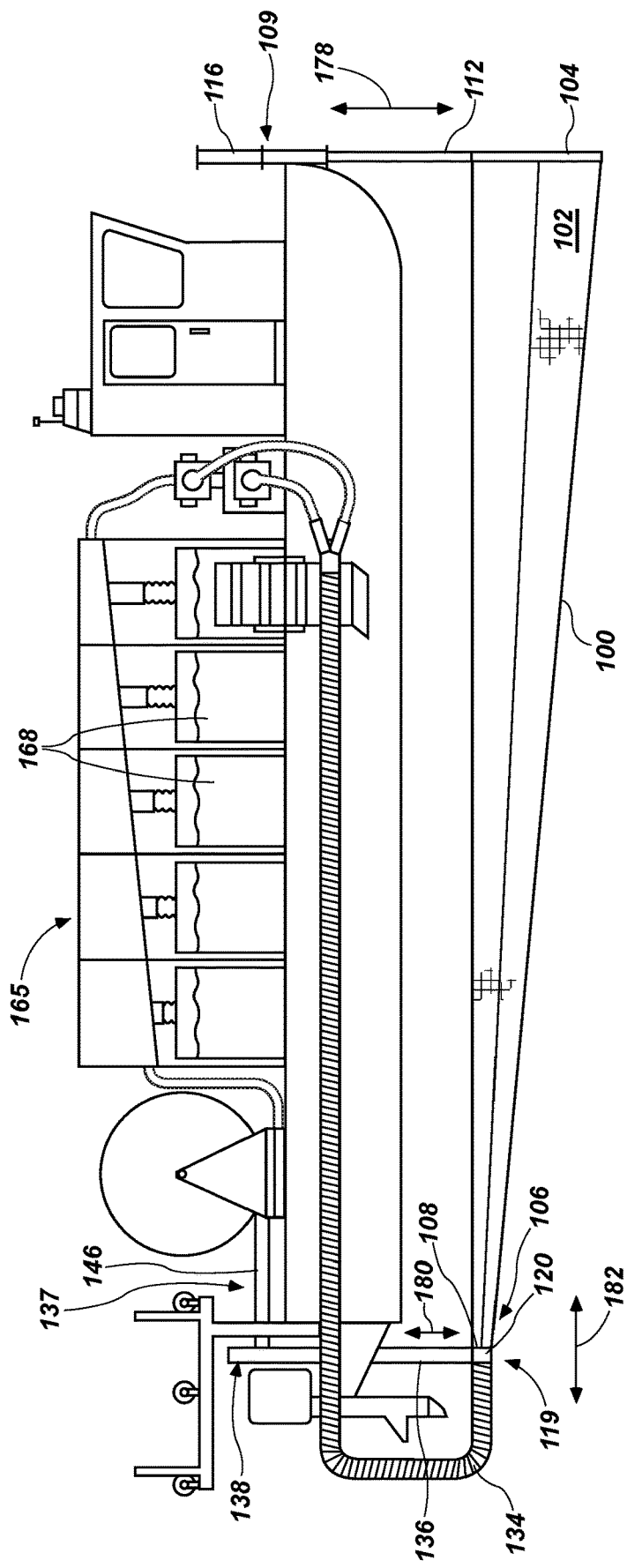
FIG. 2 is a side view of a vessel mounted artemia harvest device according to one embodiment of the present invention.
Figure 3:
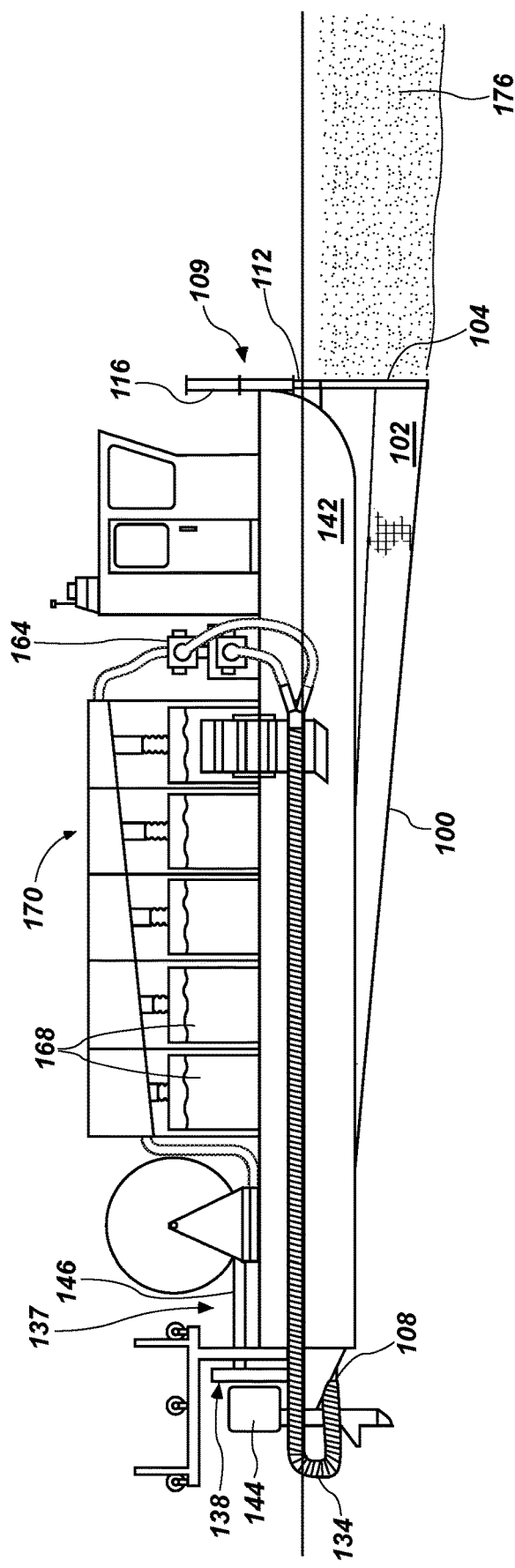
FIG. 3 is a side view of a vessel mounted artemia harvest device according to one embodiment of the present invention.

Referring to FIGS. 1-3, the vessel mounted harvest device includes a net 100 having a first end 102 with an opening 104 for receiving a catch. The net 100 also includes a cod end 106 that is typically smaller in diameter than the first end 102 and forms a generally conical shape. The aspect ratio of the net (defined as the ratio of the length of the net to the width of the net)— which is typically at least approximately 4:1—allows the net to be largely self-cleaning. As is discussed further below, the sort of netting that must be used in harvesting brine shrimp cysts has very small openings that are easily clogged. A longer aspect ratio allows more longitudinal force across the mesh of the net. This improves the self-cleaning action of the net: reducing clogging on the sides; allowing more water to pass through the net; and concentrating the brine shrimp cysts in a slurry at the cod end 106 of the net 100. Although an aspect ratio of 4:1 or greater is not required, it is preferred to increase the efficiency of the harvest device.

The vessel includes a front net support 109 located substantially at the bow and a rear net support 119 (FIG. 2) substantially at the stern. Net 100 is secured at the first end 102 to the front net support 109 and at the cod end 106 to the rear net support 119. Having the net secured at both ends allows it to remain taut when in use. A taut net allows for better self-cleaning. In particular, a net for artemia cysts typically must have openings of roughly 200 microns or less. Thus, a net having small enough openings to be effective at catching brine shrimp cysts is very prone to clogs. A loose or dragging net will clog almost immediately, but a taut net allows for better self-cleaning action and thus increased passage of water. It also minimizes sags in the netting where unwanted materials tend to get caught.

Figure 4:
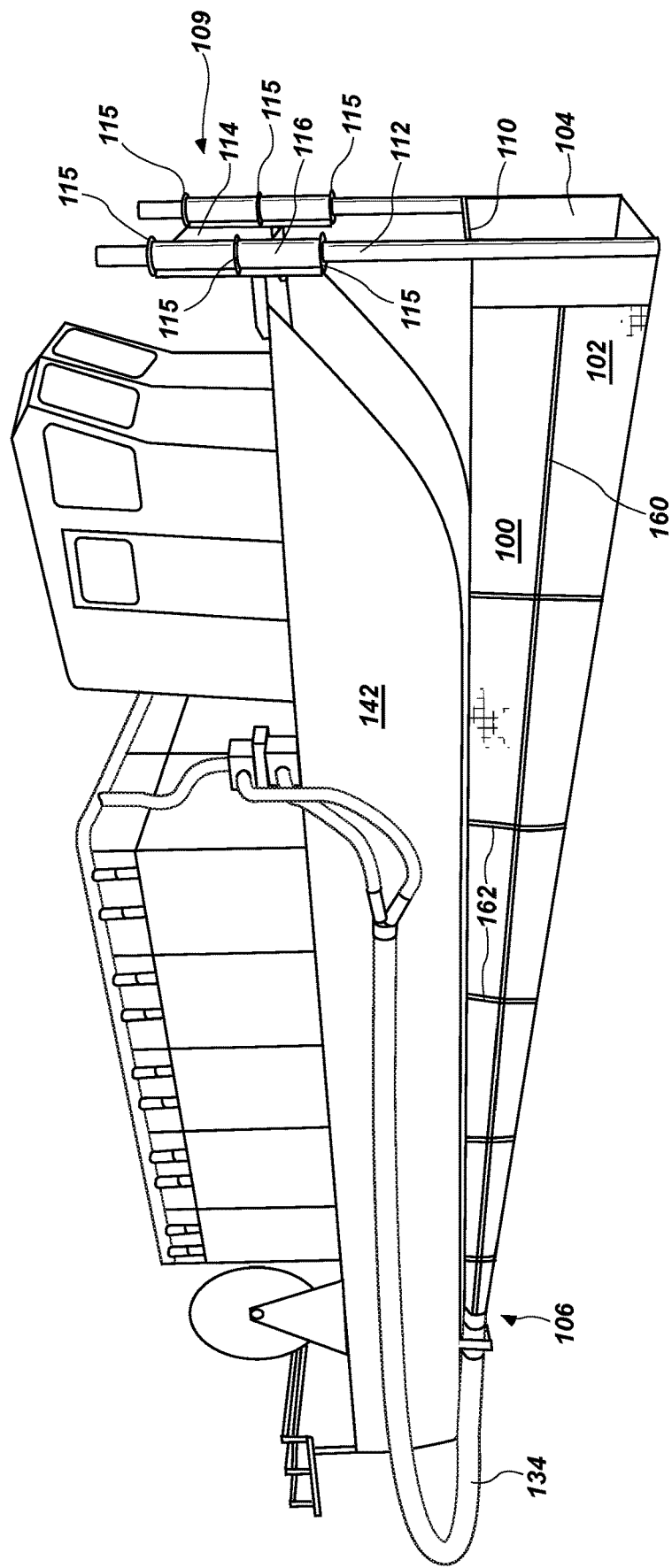
FIG. 4 is a side perspective view of a vessel mounted artemia harvest device according to one embodiment of the present invention.
Figure 5:
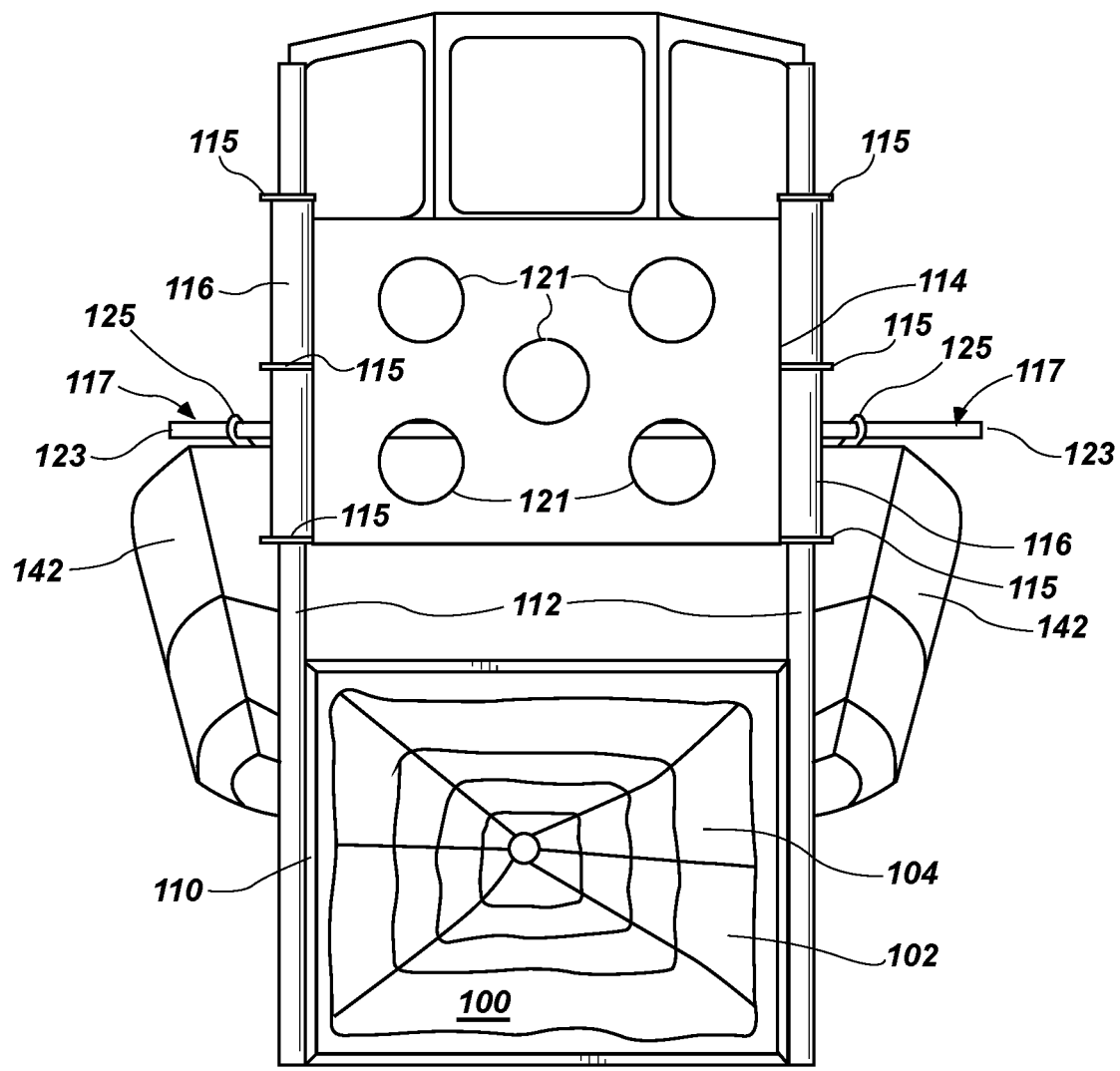
FIG. 5 is a front view of a vessel mounted artemia harvest device according to one embodiment of the present invention.

As best seen in FIG. 2, in one embodiment the upper portion of the net 100 is substantially horizontal and the lower portion is angled. This can be advantageous as the cysts have a tendency to float. Thus, a net that tapers downward can create a friction point where cysts and other debris tended to accumulate. Such a net orientation can improve the flow of material towards the back of the net 100. Nevertheless, in certain circumstances, having a net that is tapered on both the top and bottom as seen in FIG. 4 could likewise be advantageous and is considered within the scope of the present invention.

In the embodiments illustrated in FIGS. 1 and 2, the harvesting device is adjustable both vertically and laterally. The vertical adjustability of the front 102 and thus opening 104 of the net 100 is depicted at arrows 178. The vertical adjustability of the cod end 106 of the net 100 is depicted at arrows 180.

The vertical adjustability of the net 100 allows the harvesting device to capture cysts while floating on the surface and also beneath the surface. The maximum range of the net's adjustability is determined by the vessel's size and strength as well as the depth of the water body being harvested. Thus, the net 100 can be positioned (1) where it is skimming along the surface; (2) at the maximum depth accommodated by the vessel; or (3) anywhere in between.

The net 100 in the illustrated embodiment is also laterally adjustable. The lateral adjustability range is depicted with arrows 182. Lateral adjustment serves a different purpose than the vertical adjustment. In particular, as noted above, keeping the net taut allows improved self-cleaning performance. The lateral adjustments are done to preserve the tautness of the net. This capability also allows nets 100 to have increased longevity. Specifically, over time, the net will begin stretching to some degree. By allowing for lateral adjustment, a net 100 that has started stretching can still be used and remain taut without compromising the fluid connectivity between the cod end 106 and the conduit 134 which provides suction and through which the catch is brought onto the harvest vessel. Lateral adjustability also allows the net 100 to be temporarily loosened as may become necessary to remove foreign objects. Lastly, it allows the net 100 to be more easily de-coupled from the conduit 134 and retrieved to be stored on the vessel.

Referring now to FIGS. 4-9, a more detailed view is shown of a front net support 109 according to one embodiment of the present invention. In this embodiment, the net 100 is secured to a front support frame 110. In this illustration, the support frame 110 is a metal frame that corresponds to the opening 104 of net 100. The frame 110 is coupled to arms 112 on each side. These arms 112 correspond to sleeves 116 coupled to a brace 114. As discussed above, vertical adjustment can be accomplished by positioning the arms 112 in the sleeves 116 to a point where the net opening 104 will be located at the desired depth. The relative position of the arms 112 in the sleeves 116 can be locked by pins, bolts, compression fittings (where sleeves 116 are tightened around the arms 112 when properly positioned) or other known connection mechanisms.

In the illustrated embodiments, the sleeves 116 are substantially flanking the brace 114. However, in other embodiments, the sleeves 116 may be located elsewhere on the brace 114. In yet other embodiments, the sleeves 116 may be directly fastened to the vessel without any brace 114. However, the brace 114 is advantageous in that it provides added strength against the strain on the arms 112 and sleeves 116 as the vessel moves through the water. The presently illustrated brace 114 has five holes 121. These are provided to maximize strength relative to materials used. However, in other embodiments, more or fewer or no holes may be utilized.

The sleeves 116 in the illustrated embodiment include one or more ridges 115. These ridges 115 give the sleeves 116 more strength. It is noted that the arm 112/sleeve 116 configuration is preferable in that it allows easy installation of the net and adjustability once installed. However, in certain embodiments, it may be desirable to have the front net support 109 in a reverse configuration—i.e. the frame 110 is instead coupled to sleeves 116 that engage arms or posts mounted on the brace 114. In yet other embodiments, hybrids of these connection mechanisms may be utilized.

In the illustrated embodiment, the brace 114 is also attached by a hinge to the vessel. Specifically, the brace 114 is attached with hinging mechanism 117 (FIGS. 5 and 8) to the deck at substantially the front edge of the vessel. Thus it can be laid flat when not in use so as to reduce the risk that wave action during storms or the pressure of the water at high speeds will damage the unit or reduce the boat's stability. The hinging mechanism 117 in this embodiment is a rod 123 fastened to brace 114, but rotationally secured on its two ends to the deck with knuckles 125. When ready to be used, the front support frame 110 and net 100 can be secured to the brace 114 while it is lying substantially flat by inserting the arms 112 into the sleeves 116. In this illustration, the front support frame 110 will then be suspended over the front end of the vessel. When the brace 114 is raised on its hinge, the front support frame 110 rotates to its proper position at the bow. The cod end 106 can then be secured at the stern in the manner described below. A hingedly connected brace 114 allows easier attachment of the support frame 110 and net 100.

While helpful, a hinging mechanism is not required. In other embodiments, the brace 114 or a brace-less front net support 109 can simply be welded or otherwise immovably secured to the bow of the boat—whether on the deck or some other location.

Figure 6:
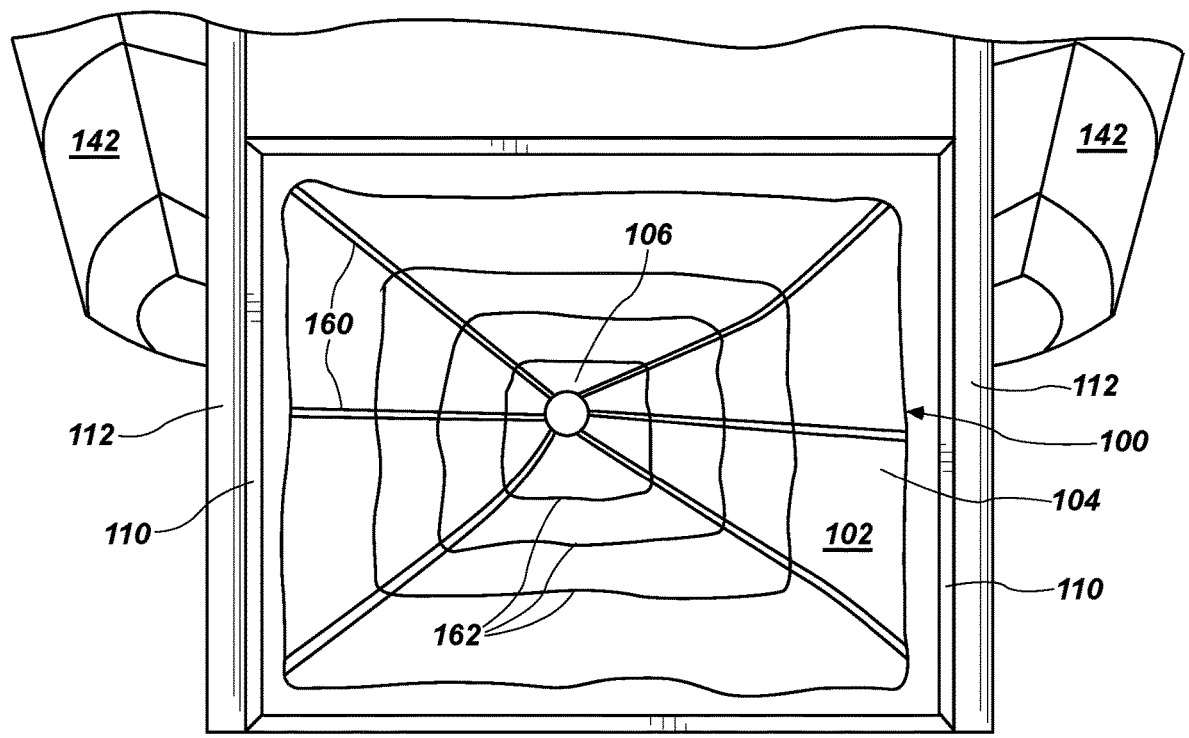
FIG. 6 is a front view of a vessel mounted artemia harvest device net opening according to one embodiment of the present invention.
Figure 7:
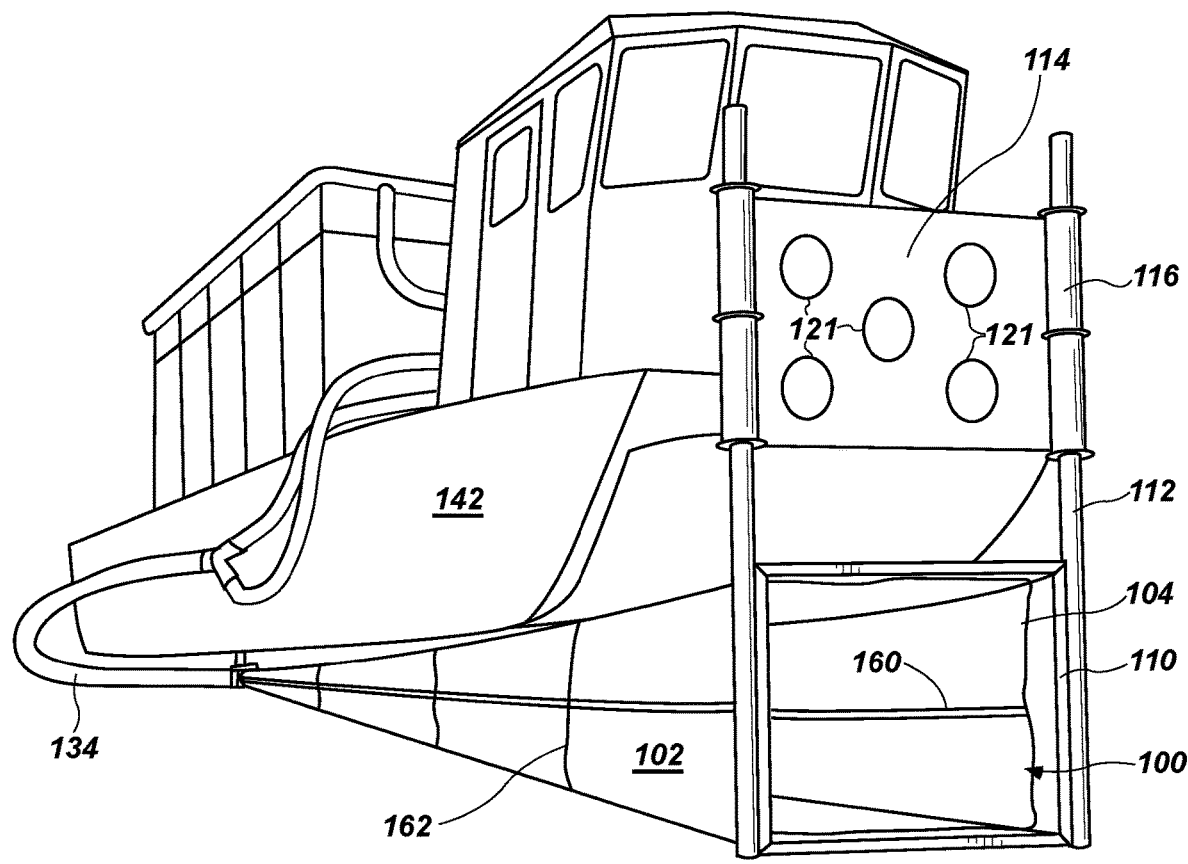
FIG. 7 is a front perspective view of a vessel mounted artemia harvest device according to one embodiment of the present invention.
Figure 8:
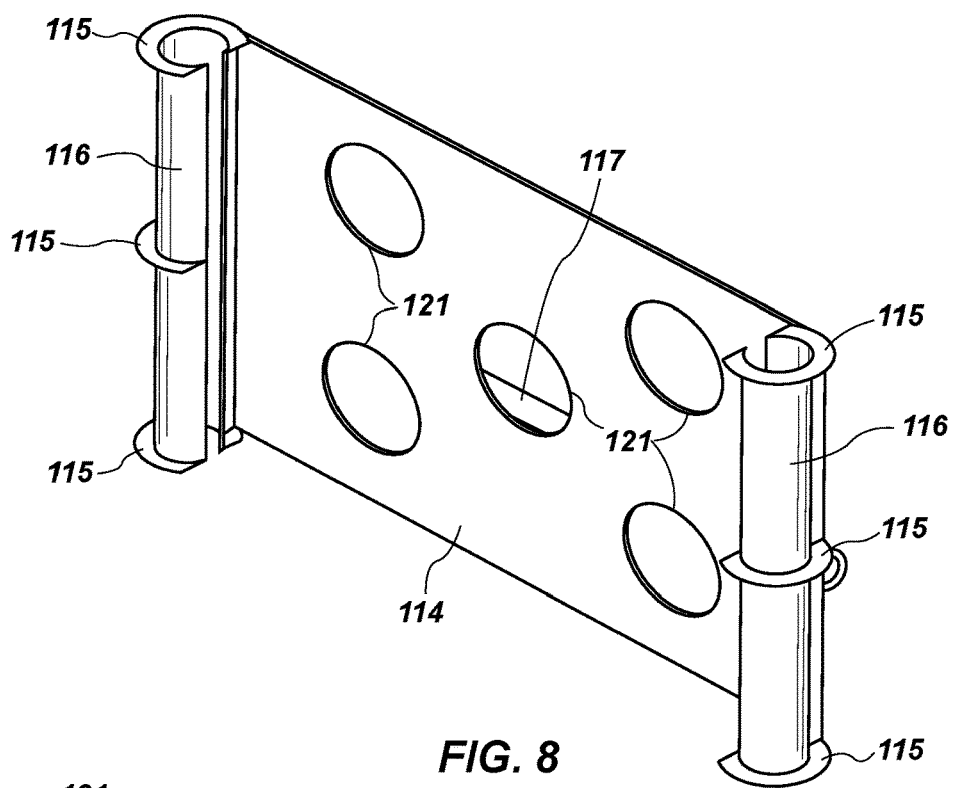
FIG. 8 is a front perspective view of a front net support brace according to one embodiment of the present invention.
Figure 9:
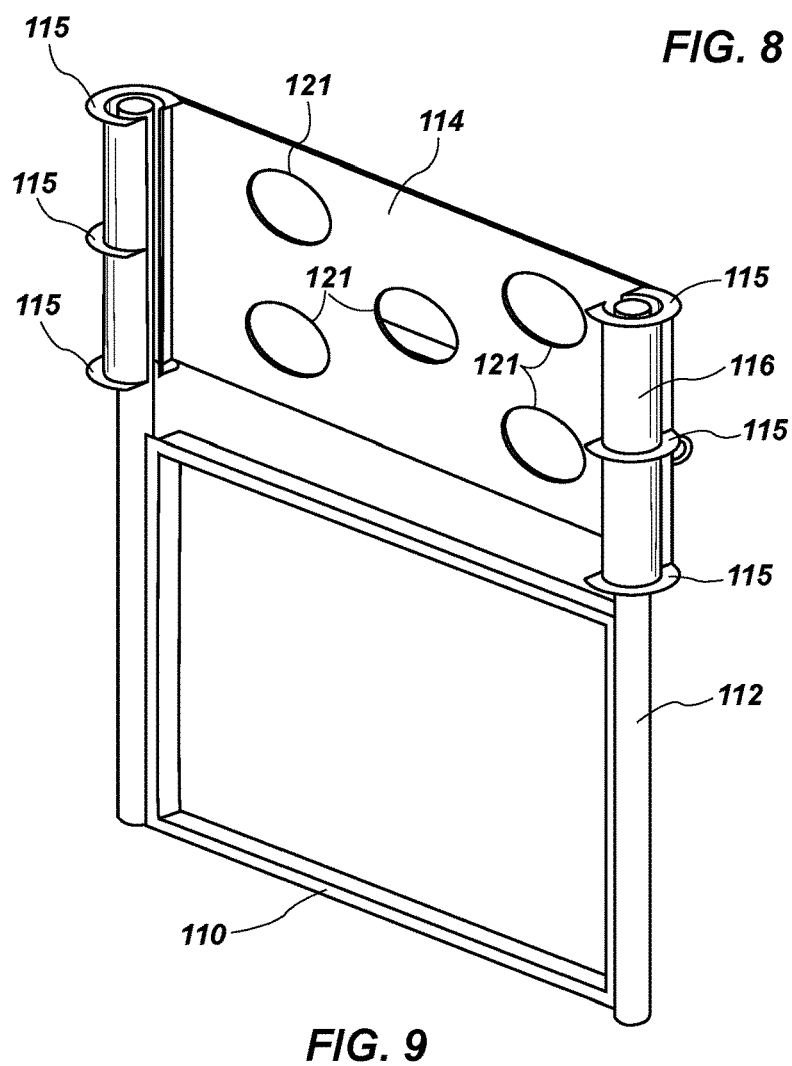
FIG. 9 is a front perspective view of a front net support according to one embodiment of the present invention.
Figure 19:
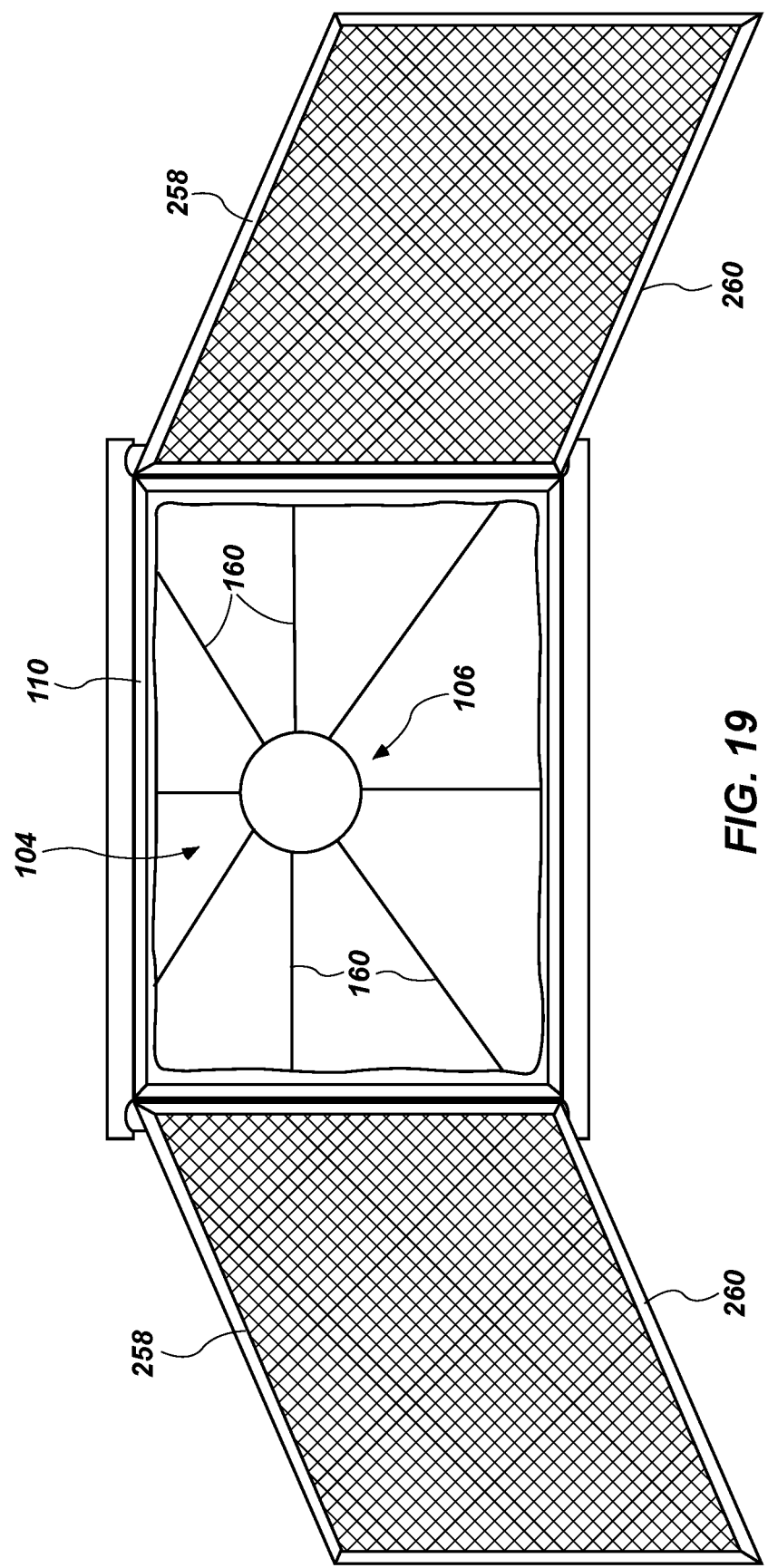
FIG. 19 depicts a net opening equipped with wings according to one embodiment of the present invention.

As seen in FIG. 6, the net opening 104 substantially corresponds to the shape of frame 110. Numerous connection mechanisms as would be apparent to one skilled in the art could be utilized to secure the net 100 to frame 110 including, but not limited to, bolts, straps and adhesives. It is also noted that the front support frame 110 does not need to be square or any particular shape, but should largely conform to the shape of net opening 104. As seen in FIG. 19, frame 110 or more generally the front net support 109 can be outfitted with protruding wings 258 at opening 104 made with similar screening material or other material which would help guide the cyst accumulations towards the open end of the harvesting device. In this embodiment, opening 104 is also depicted having different dimensions—namely, the width of the opening 104 is larger but the depth is smaller. Such a configuration can be advantageous in certain circumstances as it allows the harvest device to cut a wider swath when harvesting—especially in combination with wings 258—and in shallower water. Wings 258 in this illustration include framing 260 that can itself be coupled to frame 110 or more generally the front net support 109. In some embodiments, the coupling is hinged allowing the wings 258 to be open and shut. In other embodiments, the wingspan is fixed.

Figure 16:
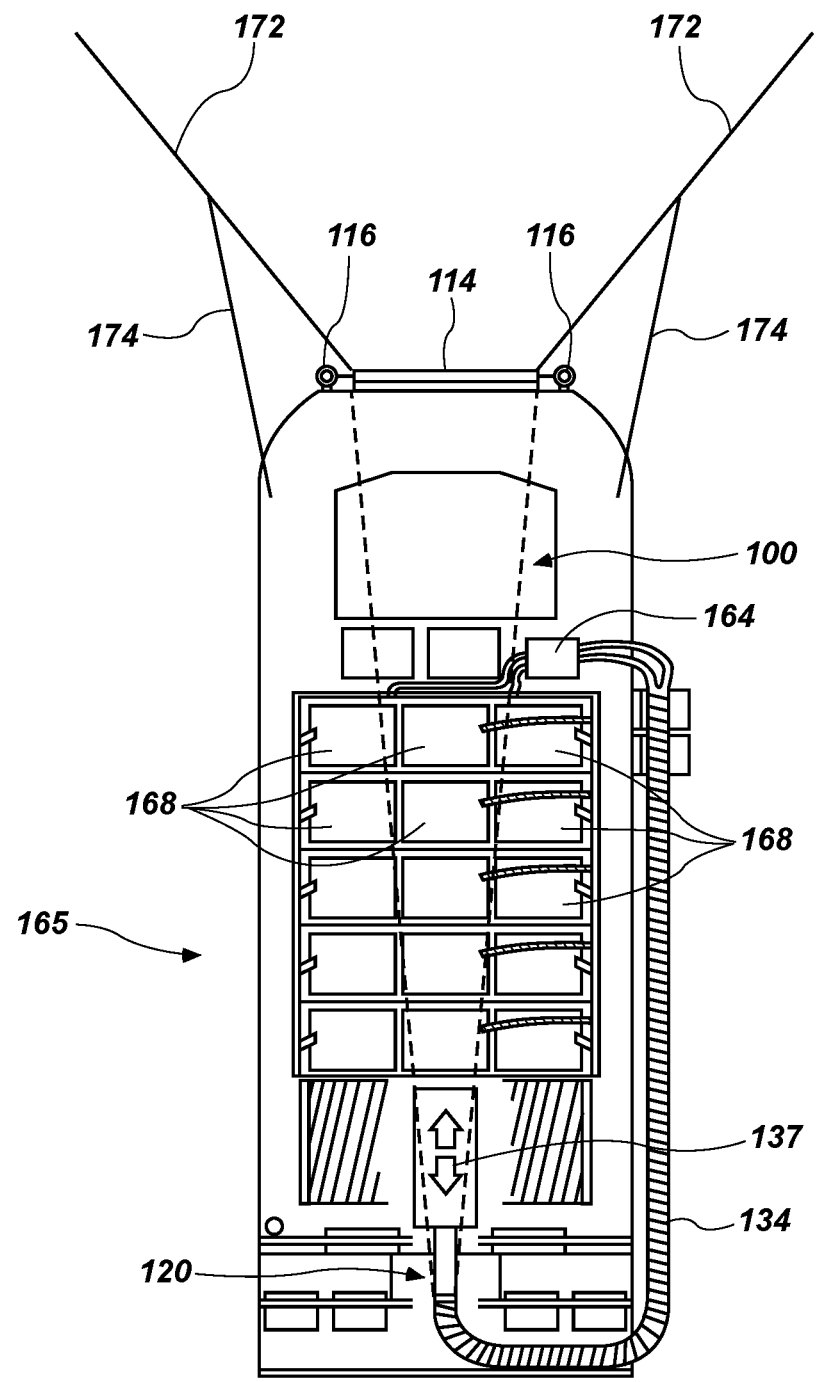
FIG. 16 depicts a top view of a vessel mounted artemia harvest device according to one embodiment of the present invention.
Figure 17:
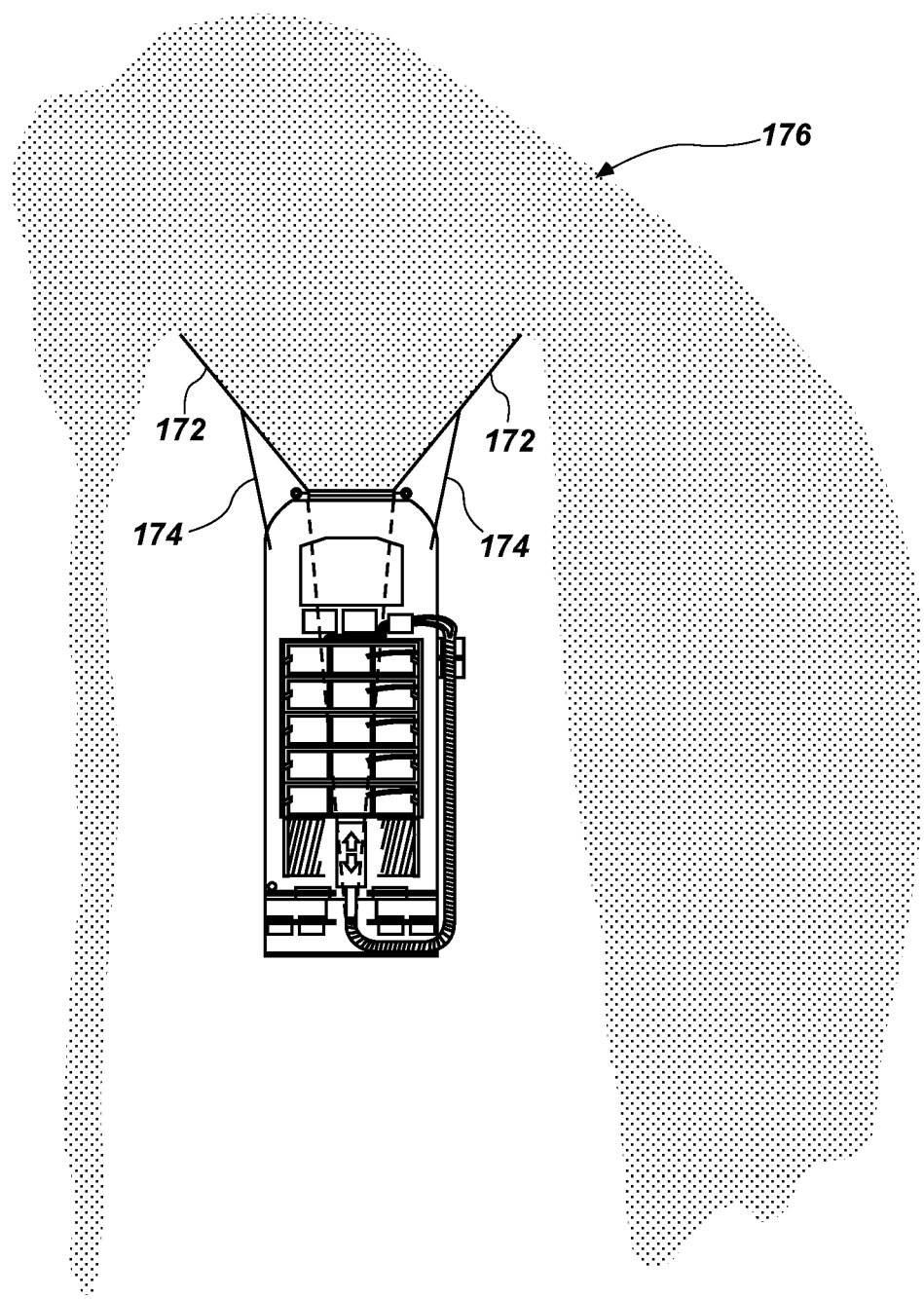
FIG. 17 depicts a top view of a vessel mounted artemia harvest device according to one embodiment of the present invention.

Referring to FIGS. 16-17, a harvesting device outfitted with protruding wings 172 according to one embodiment of the present invention is shown. Again, wings 172 are at or near opening 104 and made with similar screening material or other material which would help guide the cyst accumulations 176 towards the open end of the harvest device. In the illustrated embodiments, the wings 172 can also include one or more wing supports 174 to provide added strength as the vessel moves through the water with the increased resistance caused by the wings 172.

It is noted that the nets for zooplankton are fragile and prone to tearing. One additional advantage to the present invention is the inclusion of net panels. As best seen in FIG. 6, reinforcing divides can be included. Longitudinal divides are shown at 160. Circumferential divides are shown at 162. These divides allow damage to the net to be localized, contained and easily repaired without having to change or repair the entire net.

Figure 10:
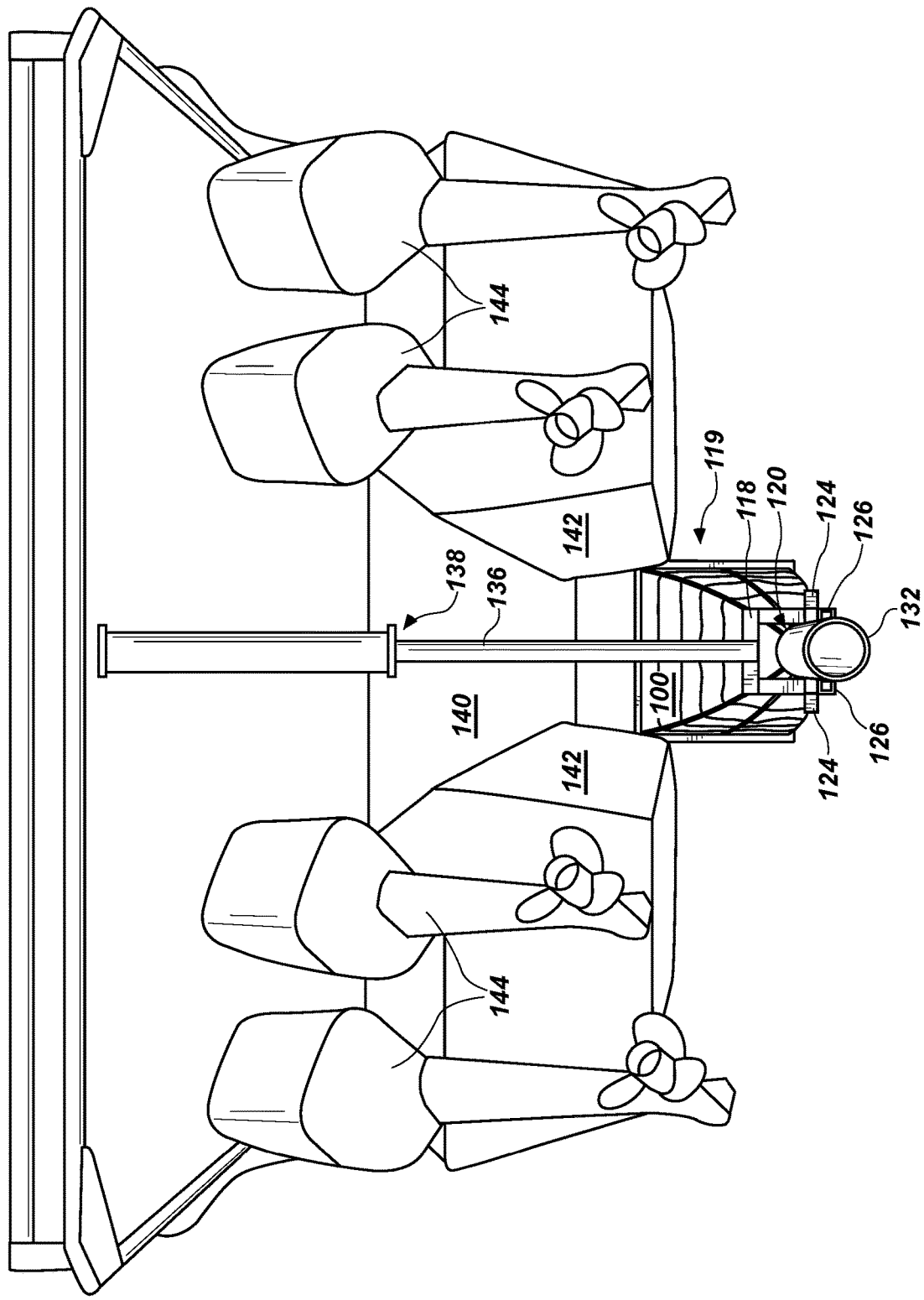
FIG. 10 is a rear view of a vessel mounted artemia harvest device according to one embodiment of the present invention.
Figure 11:
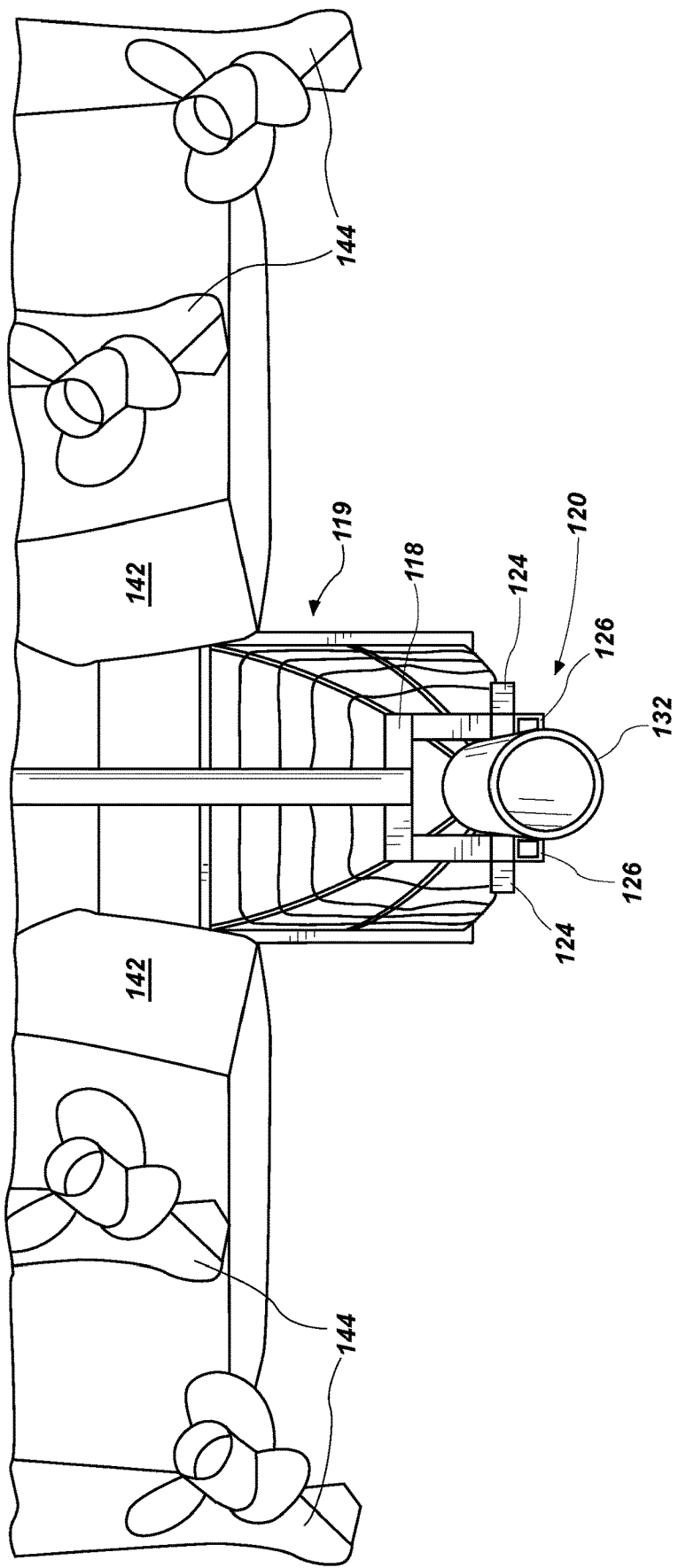
FIG. 11 is a rear view of a vessel mounted artemia harvest device according to one embodiment of the present invention.
Figure 12:
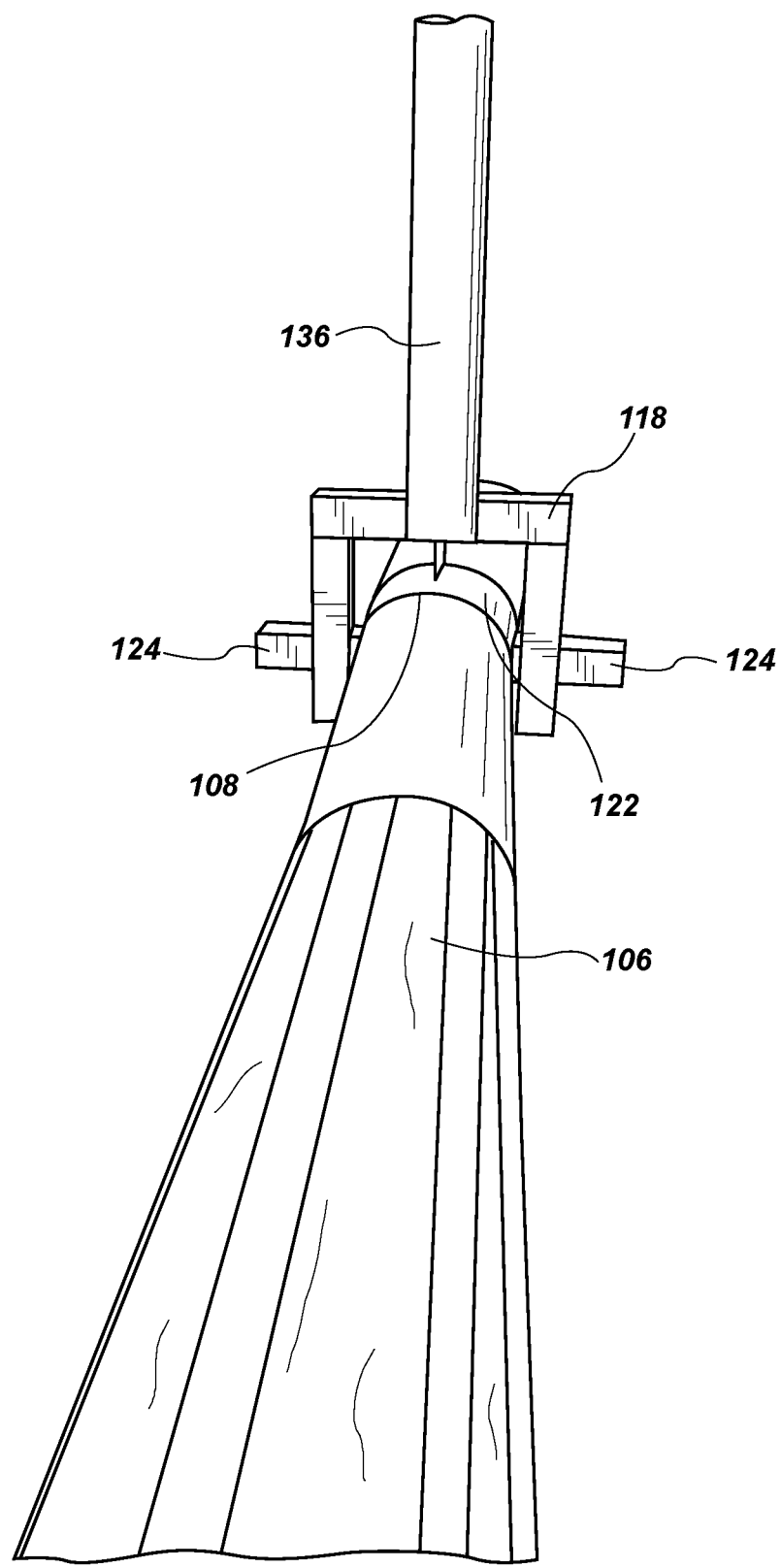
FIG. 12 depicts a rear net support according to one embodiment of the present invention.
Figure 13:
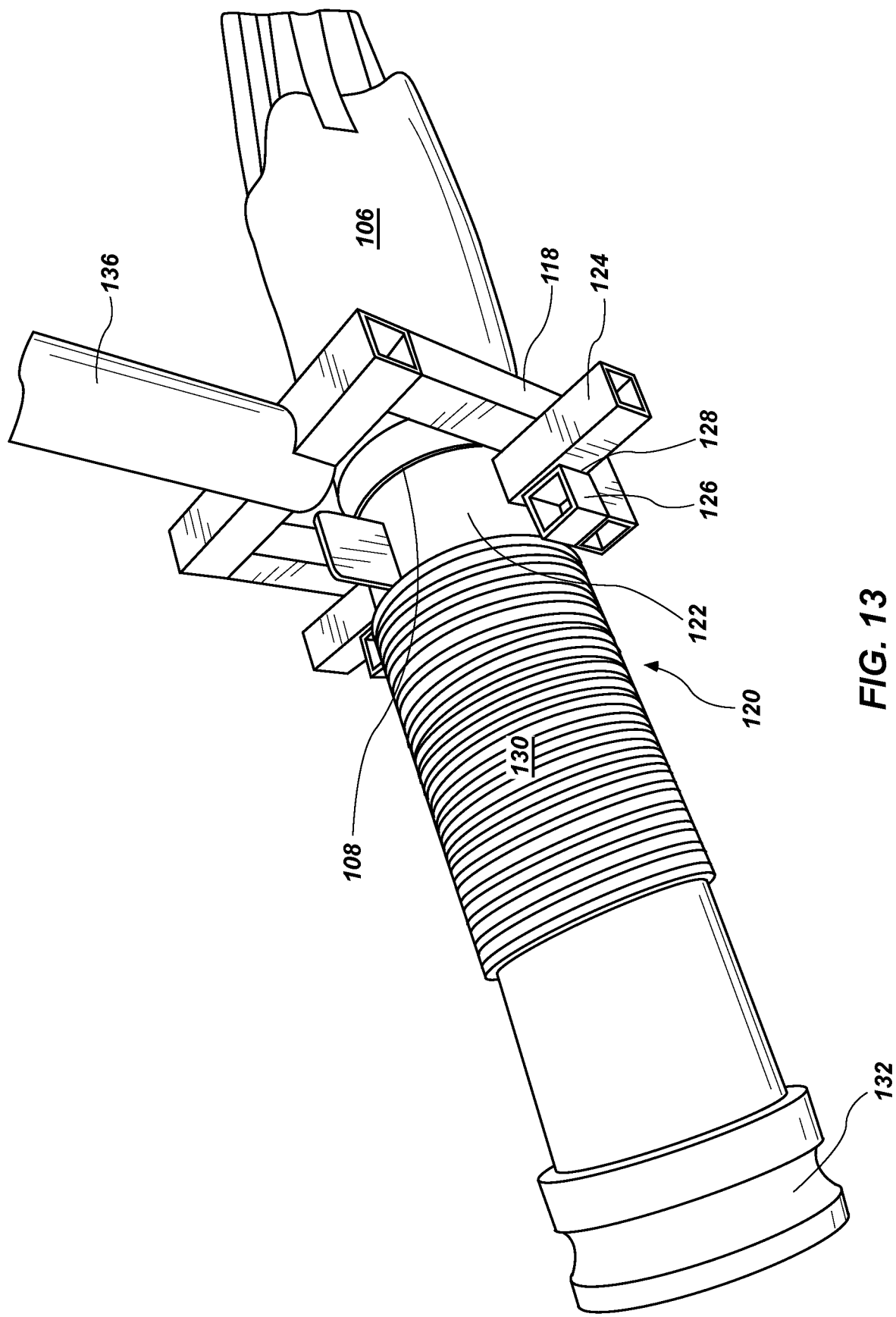
FIG. 13 depicts a cod end coupling and rear net support according to one embodiment of the present invention.

Referring now to FIGS. 10-14, additional details of the rear net support 119 are shown according to one embodiment of the present invention (pontoons 142, underside 140 of the vessel and motors 144 are shown for reference). As best seen in FIGS. 11-13, the cod end opening 108 (FIG. 12) of the net 100 is secured to the conduit 134 (FIG. 2) through a coupling 120. As best seen in FIG. 13, the coupling 120 includes an insert (partially seen at 122) that corresponds with the cod end opening 108. The insert 122 can be secured in the cod end opening 108 through a variety of mechanisms including, but not limited to, straps, elastic fittings and clamps. In this illustration, rear coupling 120 includes braces 124 that correspond to notches 128 in a rear connector frame 118. In this embodiment, the notches 128 are formed by two posts 126. The rear coupling 120 can also include a sleeve 130.

In the illustrated embodiment, coupling 120 connects the cod end 106 of the net 100 on one end and has a quick-disconnect coupling 132 on the other that attaches to the conduit 134 (FIG. 2). The quick disconnect 132 in the presently illustrated embodiment is advantageous because it allows a secure fit but also allows relatively easy removal when desired. However, in some embodiments other forms of coupling may be utilized. For example, the conduit 134 may be secured directly to the cod end opening 108 with straps. In other embodiments, snap or other connectors may be utilized. Numerous other coupling configurations could be utilized provided they allow for fluid communication between the net 100 and the conduit 134 including, but not limited to elastic fittings and clamps alone or in combination.

It is also noted that the coupling 120 need not necessarily be "tubular"—i.e. substantially round in its cross-sectional shape. It could be a variety of cross-sectional shapes provided it can be joined (directly or by including additional fittings) with the cod end 106 and the conduit 134 to create a substantially sealed, fluid connection between the net 100 and the conduit 134.

Referring to FIGS. 10 and 12, the frame 118 is secured to a shaft 136 that is part of a mechanical vertical adjustment system 138. In one embodiment, the vertical adjustment system 138 is a hydraulic ram, though in other embodiments, different adjustment mechanisms such as screw devices could be used alone or in combination to create the same kind of vertical motion. As best seen in FIG. 10 and as discussed previously herein, the shaft 136 can be raised or lowered—thereby raising or lowering the frame 118 and thus the cod end 106 of the net 100—depending on need and circumstance.

Figure 14:
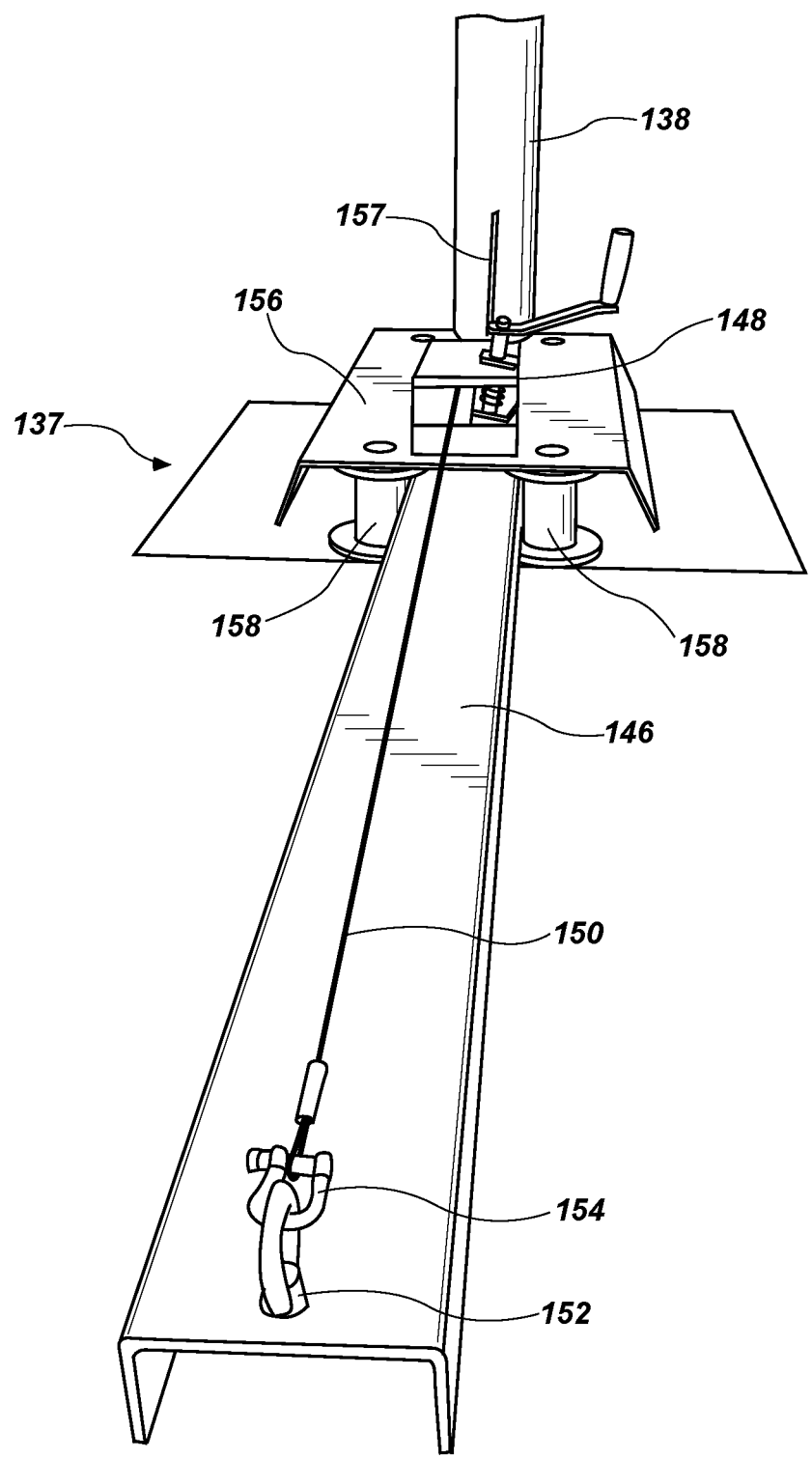
FIG. 14 depicts a lateral net adjustment mechanism according to one embodiment of the present invention.
Figure 15:
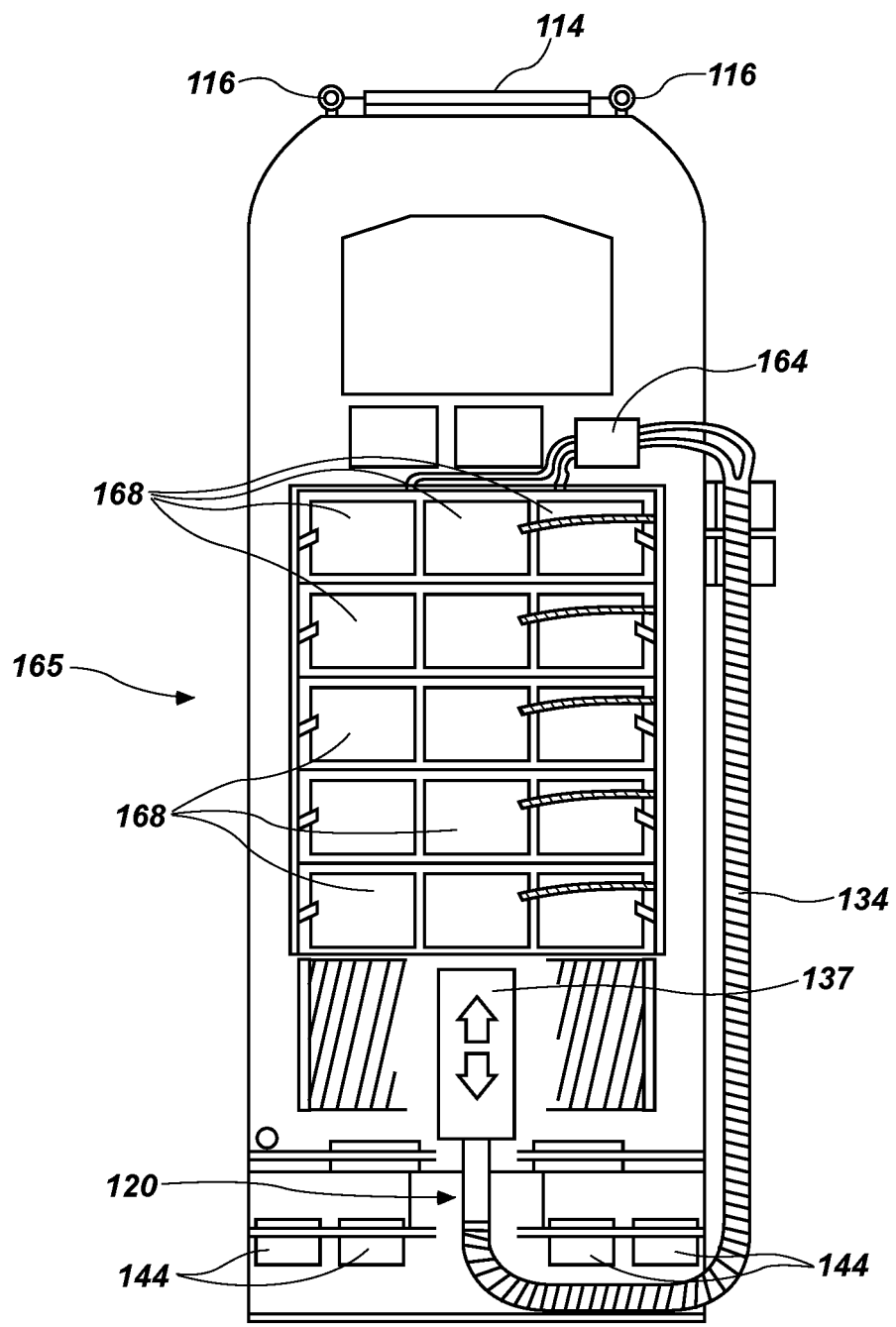
FIG. 15 depicts a top view of a vessel mounted artemia harvest device according to one embodiment of the present invention.

As noted previously, the harvest device can also include a lateral net adjustment mechanism 137. Referring to FIG. 14, in one embodiment, the lateral net adjustment mechanism 137 utilizes a two-line winch 148 and a beam 146. Specifically, the beam 146 is coupled at one end to the vertical adjustment mechanism 138 at approximately a ninety-degree angle. In this illustration, coupling is through a welded angle bracket 157 though numerous other connection mechanisms as would be apparent to one skilled in the art could be utilized. On its other end, the beam 146 includes an eyehook 152 or some other known fastening mechanism. The winch 148 sits on a platform 156 with one line 150 (e.g. a wire rope or other suitable cable) secured to the eyehook 152 and the other line (not shown) secured to the vertical adjustment mechanism 138.

As the winch 148 is reeled in a first direction, it winds up line 150 attached to the beam 146 thereby pulling the beam 146 toward the stern of the vessel. This motion is translated to the vertical adjustment mechanism 138 moving it—and thus the rear connector frame 118 and cod end 106 of net 100—out away from the stern of the vessel. As the winch is reeled in the first direction, the cable secured to the vertical adjustment mechanism 138 simultaneously unwinds allowing the vertical adjustment mechanism 138 to freely move.

Turning the winch 148 in the opposite direction creates the opposite motion—i.e. it winds up the line connected to the vertical adjustment mechanism 138 and simultaneously unwinds the line connected to the beam 146, thereby pulling the vertical adjustment mechanism 138 back toward the stern of the vessel and allowing the beam 146 to return to its previous position.

In the illustrated embodiment, line 150 includes an anchor shackle 154 at its end whereby line is secured to the eyehook 152. It is noted that numerous other connection mechanisms as would be apparent to one skilled in the art could be utilized to secure the winch lines to both the beam 146 and the vertical adjustment mechanism 138. In the illustrated embodiment, low friction guides or spools 158 are included to guide and ease movement of the beam 146 as it is extended and retracted. As noted previously, this lateral movement of the net 100 is advantageous in that it allows a user to keep the net taut when in use.

Referring now to FIGS. 1-3, 15-17, once the cysts are extracted from the cod end 106 of the net 100, they must be dried as part of their processing. Typically, the extracted cysts would be deposited in dewatering devices shown generally at 165 on the harvest vessel. In the illustrated embodiment, the slurry from the cod end 106 is pulled through the conduit 134 by one or more pumps 164. It is then pushed out of the pumps 164 into a manifold from which it is deposited to a series of containers 168. One type of dewatering container is a harvest bag. Harvest bags are porous bags that allow water shedding while retaining the cysts.

In some embodiments, other dewatering methods can be utilized alone or in combination with harvest bags. For example, a water screen could be utilized that is placed after the manifold. The slurry is run over the screen allowing the water to seep through, while the cysts remain on top and can be easily gathered. Alternatively, running the slurry through a continuous centrifuge or over vibrating screens would further concentrate the cysts.

Figure 18:
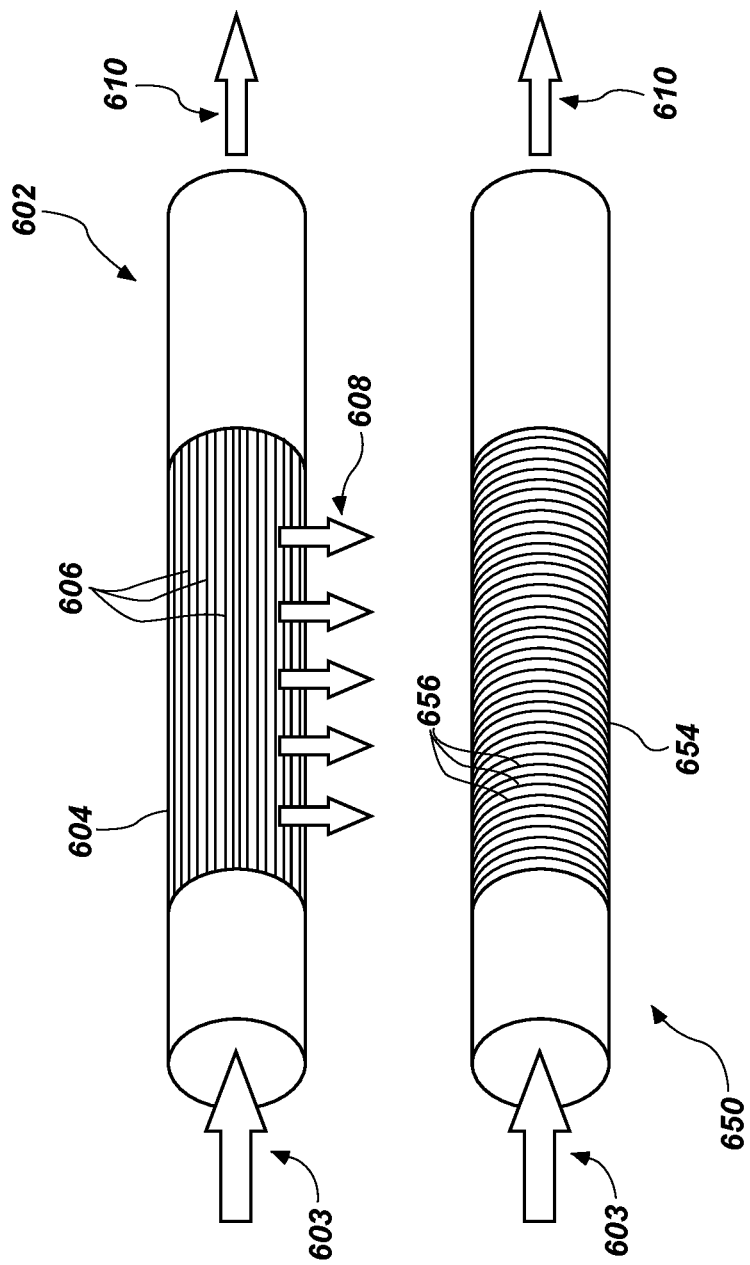
FIG. 18 depicts dewatering attachments according to certain embodiments of the present invention.

Referring to FIG. 18, attachments 602 and 650 can allow for reduced dewatering time on the vessel. Attachment 602 utilizes a wedge wire cylinder 604 that can be placed in line with the conduit (e.g. 134). The wedge wire cylinder 604 includes a plurality of radially oriented wires 606 that allow water 608 to pass through while retaining the catch. Thus, the slurry depicted at arrow 603 enters attachment 602 and is at least partially dewatered. The reduced water slurry depicted at arrow 610 can then be transported to harvest bags or other known dewatering techniques.

In yet another embodiment depicted at 650, the wedge wire cylinder 654 includes axially oriented wire 656. It similarly allows water to pass through while retaining the catch. Thus, the slurry depicted at arrow 603 enters attachment 650 is dewatered and then the reduced water slurry depicted at arrow 610 can then be transported to harvest bags or other known dewatering techniques.

In some embodiments, both radially and axially oriented wire cylinders may be utilized. Additionally, other dewatering devices could be used such as a continuous flow centrifuge, vibrating screens etc.

Other dewatering devices could also be utilized alone or in combination with those described above. For example, in some embodiments, a manifold is not used and the entire slurry content is deposited in a single container or over some similar water shedding device. In other embodiments, after the manifold (or in embodiments without a manifold after being drawn from the cod end 106), a screen could be employed having a series of narrow slits. As noted above, once the slurry is poured onto screen, water drains through and cysts and any remaining water rest on top.

It is noted that the pump 164 placement and number of pumps 164 could vary according to need and circumstance. In some configurations, the pumps 164 could be placed closer relative to the cod end 106 and effectively push the slurry the entire distance to the dewatering station 165. The pumps 164 could similarly be placed at any point along the conduit 134. A pump 164 suitable for use with the present invention is a Bowie ED4400 pump used either in combination with another pump (as illustrated) or singly in combination with jet nozzles to increase the volume of water to the desired range.

Variations

It is noted that the discussion above has focused primarily on harvesting brine shrimp. However, the present invention is not intended to be limited to any particular catch. While the greatest presently known utility is in the context of *Artemia*, the invention could also be utilized to harvest other small aquatic organisms including but not limited to various zooplankton species.

Figure 20:
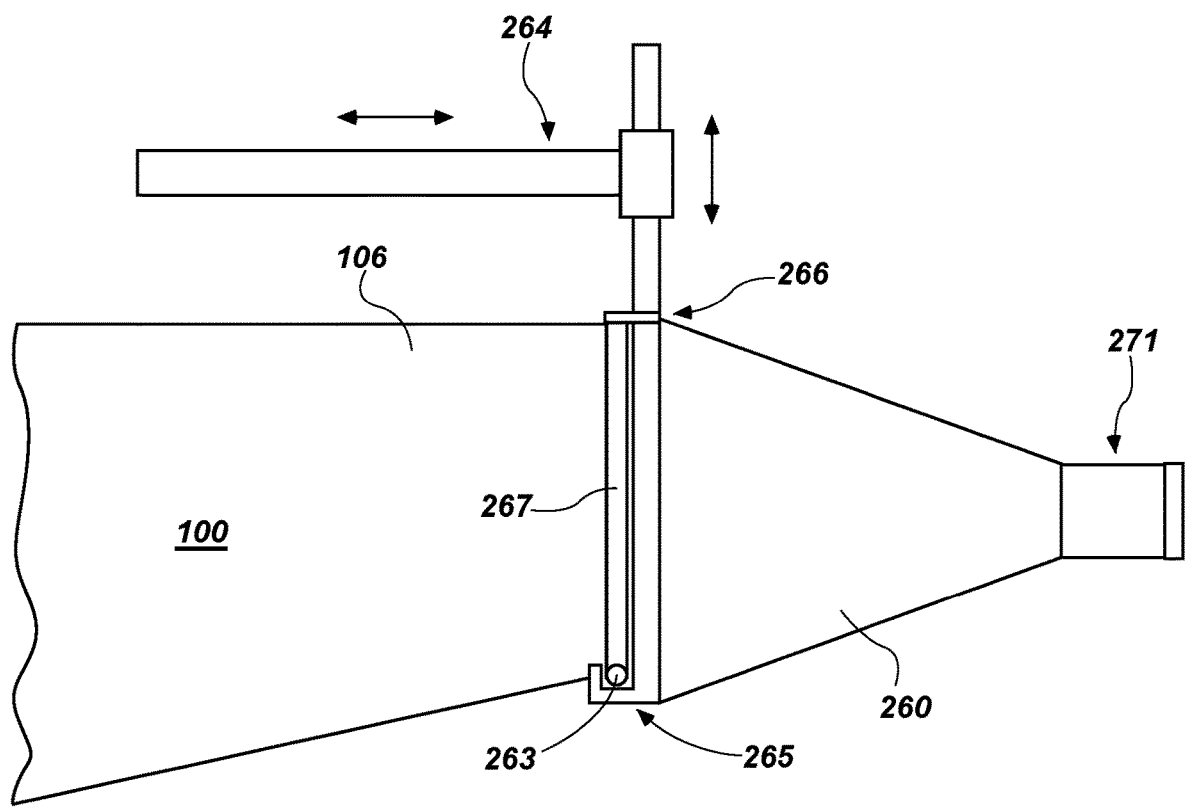
FIG. 20 depicts a side view of a coupling according to one embodiment of the present invention.
Figure 21:
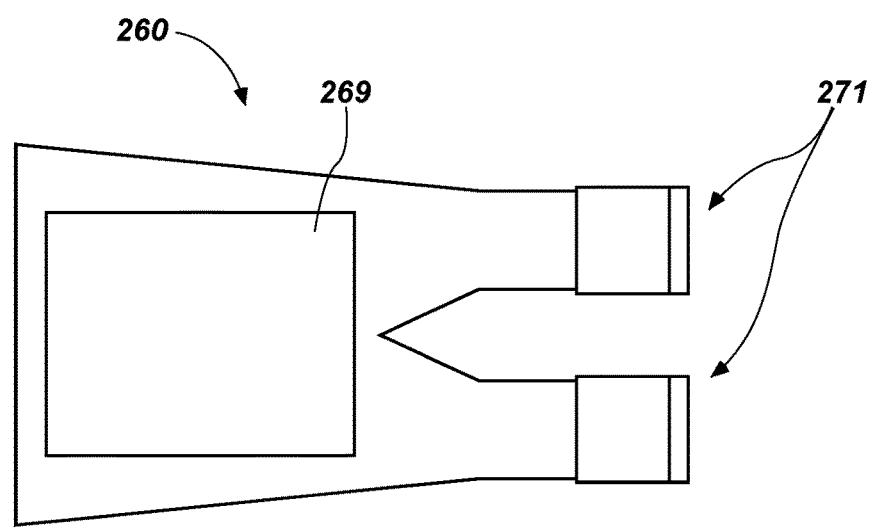
FIG. 21 depicts a top view of a coupling according to one embodiment of the present invention.

FIGS. 20-22 depict an alternate coupling 260 for the cod end 106 to be secured to a conduit (e.g. 134). This coupling 260 includes an opening 262 (FIG. 22) that can be secured to the cod end 106 of a net 100. In one embodiment, the cod end 106 is secured to coupling 260 by inserting a lower locking pin 263 on a cod end frame 267 into groove 265 and securing the opposite end with latch 266 (FIG. 20). A tensioner 264 can also be utilized to pull the net tight in the harvest device. In some embodiments, the cod end 106 can be enlarged to improve flow.

Other attachment mechanisms can also be used to secure net 100 to coupling 260. For example, in certain embodiments, a frame fitting is utilized where the cod end 106 is essentially sandwiched between a male frame piece and a corresponding female frame piece which are then secured with known fastening mechanisms. For example, the cod end 106 could be slipped through a substantially square shaped inner frame section (FIG. 22) and wrapped around the edges of the inner frame (similar to how embroidery hoops work) and inserted into outer frame opening 262. The inner and outer frames could be further secured together with a variety of known mechanisms including, but not limited to clamps and nuts and bolts thereby locking the cod end 106 in place.

As best seen in FIGS. 21 and 22, coupling 260 can include an access door 269 allowing a user to clean out debris and clogs as needed. Coupling 260 is also depicted having two outputs 271 that can be coupled to one or more conduits (e.g. 134). In certain embodiments, it may be desirable to have more or fewer outputs and all are considered to be within the scope of the present invention.

In yet other embodiments, additional pumps could be installed at various points along the net 100. For example, as seen in FIG. 24, a pumping mechanism 270 could be secured substantially at the net opening 104. Water can be directed into pump through hoses (not shown) coupled to nipples 272. Pumping mechanism 270 in this embodiment is perforated conduit. As water enters pumping mechanism 270 it is forced out perforations 274 creating a nozzle effect which helps push the netted harvest to the cod end 106 of the net 100. In one embodiment, the pumping mechanism 270 is made out of polyvinyl chloride (PVC) pipe. However, in other embodiments, it may be advantageous to utilize other conduit materials including but not limited to acrylonitrile butadiene styrene (ABS) pipe, rubber or plastic hosing or combinations of the same. Nipples 272 are quick connect hose couplings but could be other known hose connection mechanisms as would be apparent to one skilled in the art.

Similarly, FIG. 23 depicts a pumping mechanism 280 that can be placed deeper into the net 100 but have generally the same effect as mechanism 270. In the illustrated embodiment, pumping mechanism 280 includes an outer frame 282 with cross members 284, 286. Cross members 284, 286 are again perforated conduits that could be made from a variety of materials including, but not limited to, PVC, ABS, hosing or combinations thereof. Cross member 284 includes a nipple 287 that, in this embodiment, is a quick connect hose coupling allowing water to be directed into to the pumping mechanism 280 and forced out through perforations 288 creating a nozzle effect and helping push the netted harvest to the cod end 106 of the net 100. In certain embodiments, additional structural supports for sprayers and hoses can also be added inside the net 100.

With the present device, it may be necessary to modify the harvest bags on the vessels to accommodate the larger volume of water that passes through the system. In particular, in typical harvesting activities, 1000-micron harvest bags are used. However, in certain conditions, it is preferable to include a smaller mesh bag inside the primary harvest bag. In one embodiment, a 200-micron mesh bag is placed inside the 1000-micron bags. While the 200-micron bags can tear easily, the 1000-micron bag on the outside provides reinforcement and also makes it usable with standard hooks, supports, and other equipment.

In yet other embodiments, the net 100 can be equipped with a mesh backing on the outside to give it additional strength. A one-inch mesh has been found to provide favorable results, but other mesh sizes could be utilized. The net 100 can also be modular to allow for easier repair. For example, the net 100 can utilize zippered panels so that it is possible to change out a damaged section rather than the entire net. In some embodiments, a large mesh screen can be placed at the net opening 104 to keep out larger debris.

The width of the net could be narrower than, substantially the same as or in some embodiments wider than the vessel. It could also vary in height depending on need and circumstances.

The present harvesting device could accommodate wide variety of net shapes. "Conical" is not intended to be limited to specific geometric shape. Rather, any three dimensional net having an opening at one end and that narrows as it approaches the other end is considered "conical" for purposes of the present invention. The degree of tapering could vary widely depending on circumstances and preferences. However, as noted above, an aspect ratio of at least 4:1 is preferred for its self-cleaning characteristics.

The front frame 110 is described above as being substantially square in shape, but could be other shapes including but not limited to substantially circular, oval or polygonal.

The frame (front and rear) can be made of a variety of materials. Aluminum is suitable because it is relatively strong, lightweight and resistant to corrosion in the salty environments where used. Numerous other materials could also be utilized including but not limited to steel, wood, composites and carbon fiber alone or in combination.

The net can be made of numerous materials including, but not limited to nylon, organic polyamides and wire. It is also noted that as used herein "net" does not necessarily mean a fibrous net as the term is widely known. A net could also be a screen, cloth, fabric or other semi-permeable material that allows water to pass through but that largely retains a catch.

As noted above, dewatering mechanisms on the harvest vessel are used to shed additional water and further concentrate the slurry. Additionally, the vessel can also be equipped with separating screens or hydro cyclones in order to separate brine shrimp cysts from non-cyst material.

What is claimed is:

1. A device mounted to a vessel for harvesting a subsurface concentration of artemia cysts comprising:
    a) a vertically adjustable front net support including a net frame;
    b) a rear net support having a vertical adjuster and a lateral adjuster, wherein the lateral adjuster comprises a winch in communication with a beam coupled to the vertical adjuster;
    c) a net having a first end secured to the vertically adjustable front net support and a second end secured to the rear net support and wherein the lateral adjuster allows the net to remain substantially taut when in use;
    d) a conduit coupled to the second end of the net whereby the subsurface concentration of artemia cysts is drawn from the second end of the net to a processing destination.

2. The device of claim 1, wherein the net frame is coupled on a first side thereof to a first arm and coupled on a second side thereof to a second arm and a brace attached to the vessel, wherein the brace includes a first sleeve that corresponds to the first arm and a second sleeve that corresponds to the second arm.

3. The device of claim 2, wherein the front net support includes a first wing and a second wing and wherein the first wing is attached to the front net support on the first side of the net frame and the second wing is attached to the front net support on the second side of the net frame opposite the first side of the net frame.

4. The device of claim 1, wherein the vertical adjuster comprises a rear connector frame secured to a shaft capable of being raised and lowered, thereby raising or lowering the rear connector frame.

5. The device of claim 4, wherein the vertical adjuster further comprises a hydraulic ram coupled to the shaft.

6. The device of claim 4, wherein the second end of the net is secured to the rear connector frame of the rear net support.

7. The device of claim 1, wherein the winch further includes a line attached at a first end thereof to the vertical adjuster and at a second end thereof to the beam establishing the communication of the winch with the beam.

8. The device of claim 1, wherein the beam is coupled to the vertical adjuster at approximately a ninety-degree angle.

9. The device of claim 1 wherein the lateral adjuster further comprises one or more low friction spools to guide and ease movement of the beam as it is extended and retracted.

10. The device of claim 1, wherein the net has a mesh size of 200 microns or less.

11. A device mounted to a vessel for harvesting a subsurface concentration of artemia cysts comprising:
   a) a vertically adjustable front net support comprising a net frame coupled on a first side thereof to a first arm and coupled on a second side thereof to a second arm and a brace attached to the vessel, wherein the brace includes a first sleeve that corresponds to the first arm and a second sleeve that corresponds to the second arm;
   b) a rear net support having a vertical adjuster and a lateral adjuster, wherein the lateral adjuster comprises a winch in communication with a beam coupled to the vertical adjuster;
   c) a net having a first end secured to the vertically adjustable front net support and a second end secured to the rear net support and wherein the net has a mesh size of 200 microns or less and wherein the lateral adjuster allows the net to remain substantially taut when in use;
   d) a conduit coupled to the second end of the net whereby the subsurface concentration of artemia cysts is drawn from the second end of the net to a processing destination.

12. The device of claim 11, wherein the vertical adjuster comprises a rear connector frame secured to a shaft capable of being raised and lowered, thereby raising or lowering the rear connector frame.

13. The device of claim 12, wherein the vertical adjuster further comprises a hydraulic ram coupled to the shaft.

14. The device of claim 12, wherein the second end of the net is secured to the rear connector frame of the rear net support.

15. The device of claim 11, wherein the winch further includes a line attached at a first end thereof to the vertical adjuster and at a second end thereof to the beam establishing the communication of the winch with the beam.

16. The device of claim 11, wherein the beam is coupled to the vertical adjuster at approximately a ninety-degree angle.

17. The device of claim 11 wherein the lateral adjuster further comprises one or more low friction spools to guide and ease movement of the beam as it is extended and retracted.

18. The device of claim 11, wherein the front net support includes a first wing and a second wing and wherein the first wing is attached to the front net support on the first side of the net frame and the second wing is attached to the front net support on the second side of the net frame opposite the first side of the net frame.

* * * * *